(12) United States Patent
Kim et al.

(10) Patent No.: US 12,192,990 B2
(45) Date of Patent: Jan. 7, 2025

(54) GRANT-FREE TRANSMISSION METHOD AND APPARATUS FOR NON-ORTHOGONAL MULTIPLE ACCESS IN WIRELESS COMMUNICATION SYSTEM

(71) Applicant: Samsung Electronics Co., Ltd., Suwon-si (KR)

(72) Inventors: Taehyoung Kim, Suwon-si (KR); Jinkyu Kang, Suwon-si (KR); Youngbum Kim, Suwon-si (KR); Jinyoung Oh, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 658 days.

(21) Appl. No.: 17/267,018

(22) PCT Filed: Jul. 16, 2019

(86) PCT No.: PCT/KR2019/008773
§ 371 (c)(1),
(2) Date: Feb. 8, 2021

(87) PCT Pub. No.: WO2020/032411
PCT Pub. Date: Feb. 13, 2020

(65) Prior Publication Data
US 2021/0321433 A1    Oct. 14, 2021

(30) Foreign Application Priority Data

Aug. 10, 2018 (KR) .................. 10-2018-0094004

(51) Int. Cl.
*H04W 72/1268* (2023.01)
*H04W 72/21* (2023.01)

(52) U.S. Cl.
CPC ....... *H04W 72/1268* (2013.01); *H04W 72/21* (2023.01)

(58) Field of Classification Search
CPC ............. H04W 72/1268; H04W 72/21; H04W 72/23; H04W 74/0833; H04W 52/08;
(Continued)

(56) References Cited

U.S. PATENT DOCUMENTS 10,887,898 B2 *  1/2021  Au .................. H04L 1/1812
11,291,031 B2 *  3/2022  Bae ................ H04L 5/0053
(Continued)

FOREIGN PATENT DOCUMENTS

CN    107113580 A  *  8/2017  .......... H04L 1/1887
EP    3817491 B1       7/2023
(Continued)

OTHER PUBLICATIONS

Supplementary European Search Report dated Aug. 4, 2021 in connection with European Application No. 19846686.4, 9 pages.
(Continued)

*Primary Examiner* — Ayaz R Sheikh
*Assistant Examiner* — Louis Samara

(57) ABSTRACT

Provided is a grant-free data communication method of a terminal in a wireless communication system, the method including receiving configuration information of a grant-free transmission resource, selecting a transmission resource for transmitting a physical uplink shared channel (PUSCH), based on the configuration information, transmitting uplink control information (UCI) including scheduling information of the selected transmission resource, and transmitting the PUSCH through the selected transmission resource.

15 Claims, 13 Drawing Sheets

(58) Field of Classification Search
CPC ............. H04W 72/0446; H04L 5/0053; H04L 5/0092; H04L 5/0007; H04L 5/0044; H04L 5/0005; H04L 5/0041; H04L 1/1812

See application file for complete search history.

(56) References Cited

U.S. PATENT DOCUMENTS

| | | | | |
|---|---|---|---|---|
| 11,405,905 | B2* | 8/2022 | Hwang | ................ H04W 52/08 |
| 2013/0329661 | A1* | 12/2013 | Chen | ................ H04W 72/0453 370/328 |
| 2017/0367110 | A1 | 12/2017 | Li et al. | |
| 2018/0175968 | A1 | 6/2018 | Shin et al. | |
| 2018/0227938 | A1* | 8/2018 | Lee | ................ H04L 5/0053 |
| 2018/0295651 | A1* | 10/2018 | Cao | ................ H04W 72/23 |
| 2018/0368117 | A1* | 12/2018 | Ying | ................ H04L 1/0061 |
| 2019/0261383 | A1* | 8/2019 | Kwak | ................ H04W 72/0446 |
| 2019/0357178 | A1 | 11/2019 | Bae et al. | |
| 2019/0393988 | A1* | 12/2019 | Bae | ................ H04W 72/0446 |
| 2021/0409256 | A1* | 12/2021 | Lincoln | ................ H04J 11/0056 |

FOREIGN PATENT DOCUMENTS

| | | | | |
|---|---|---|---|---|
| WO | WO-2017197075 | A1 * | 11/2017 | ........... H04L 5/0005 |
| WO | 2018/031620 | A1 | 2/2018 | |
| WO | 20180143741 | A1 | 8/2018 | |
| WO | WO-2018141126 | A1 * | 8/2018 | |
| WO | WO-2018143741 | A1 * | 8/2018 | ........... H04L 1/0061 |

OTHER PUBLICATIONS

Communication under Rule 71(3) EPC dated Feb. 13, 2023, in connection with European Application No. 19846686.4, 72 pages.
Spreadtrum Communications, "Considerations on NOMA procedures", 3GPP TSG RAN WG1 Meeting #93, May 21-25, 2018, R1-1806405, 3 pages.
Zte et al., "Grant-free non-orthogonal data transmission for eMBB", 3GPP TSG RAN WG1 NR Ad-hoc Meeting, Jan. 16-20, 2017, R1-1700255, 7 pages.
International Search Report dated Oct. 23, 2019 in connection with International Patent Application No. PCT/KR2019/008773, 2 pages.
Written Opinion of the International Searching Authority dated Oct. 23, 2019 in connection with International Patent Application No. PCT/KR2019/008773, 8 pages.
Notice of grounds for rejection dated Jun. 27, 2023, in connection with Japanese Application No. 2021-507494, 7 pages.
Notice of grounds for rejection dated Oct. 31, 2023, in connection with Japanese Application No. 2021-507494, 4 pages.
Office Action dated Jun. 25, 2024, in connection with Korean Application No. 10-2018-0094004, 7 pages.
Intel Corporation, "Grant-free UL transmission in NR," R1-1609499, 3GPP TSG-RAN WG1 #86bis, Lisbon, Portugal, Oct. 10-14, 2016, 8 pages.

* cited by examiner

GRANT-FREE TRANSMISSION METHOD AND APPARATUS FOR NON-ORTHOGONAL MULTIPLE ACCESS IN WIRELESS COMMUNICATION SYSTEM

CROSS-REFERENCE TO RELATED APPLICATIONS

This application is a 371 of International Application No. PCT/KR2019/008773 filed on Jul. 16, 2019, which claims priority to Korean Patent Application No. 10-2018-0094004 filed on Aug. 10, 2018, the disclosures of which are herein incorporated by reference in their entireties.

BACKGROUND

1. Field

The disclosure relates to a grant-free data channel transmission method for supporting non-orthogonal multiple access (NOMA) in a wireless communication system.

2. Description of Related Art

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. To achieve high data rates, implementation of 5G communication systems in an ultra-high frequency or millimeter-wave (mmWave) band (e.g., a 60-GHz band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (cloud-RAN), ultra-dense networks, device-to-device (D2D) communication, wireless backhaul, moving networks, cooperative communication, coordinated multi-points (CoMP), and interference cancellation have been developed. In addition, for 5G systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of a cloud RAN as the above-described big data processing technology may be an example of convergence of 5G communication technology and IoT technology.

A variety of services are providable due to the development of wireless communication systems as described above, and thus a method capable of appropriately providing the services is required.

Provided are an apparatus and method capable of effectively providing services in a mobile communication system.

SUMMARY

Provided is a grant-free data communication method.

According to the disclosed embodiments, services may be effectively provided in a mobile communication system.

DETAILED DESCRIPTION

Figure 1:
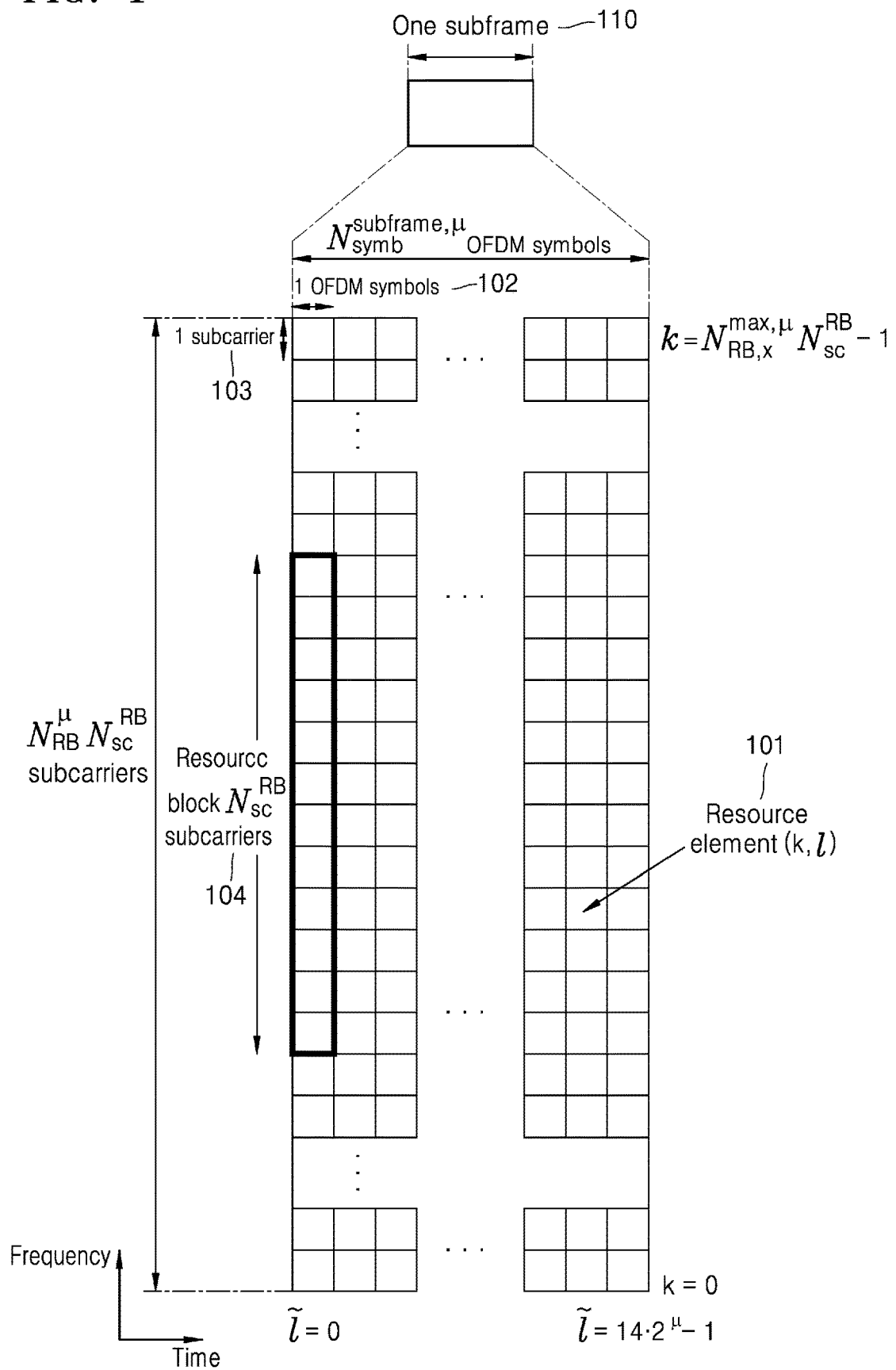
FIG. 1 is a diagram showing a basic structure of a time-frequency domain in $5^{th}$ generation communication (5G), according to an embodiment of the disclosure.

According to an embodiment of the disclosure, a grant-free data communication method of a terminal in a wireless communication system includes receiving configuration information of a grant-free transmission resource, selecting a transmission resource for transmitting a physical uplink shared channel (PUSCH), based on the configuration information, transmitting uplink control information (UCI) including scheduling information of the selected transmission resource, and transmitting the PUSCH through the selected transmission resource.

The configuration information of the grant-free transmission resource may include information about a resource region in time and frequency resource domain of the grant-free transmission resource, and periodicity information of the grant-free transmission resource, the UCI may include time and frequency resource allocation information of the selected transmission resource, and may further include index information of the selected transmission resource when a region of the grant-free transmission resource includes a plurality of partial resources, and the transmitting of the UCI may include transmitting the UCI through a partial region of the region of the grant-free transmission resource.

The resource region in the time and frequency resource domain of the grant-free transmission resource may include a fixed resource region and a flexible resource region, the partial region of the region of the grant-free transmission resource may include the fixed resource region, and the selected transmission resource may include the flexible resource region.

The transmitting of the UCI may include transmitting the UCI through a physical uplink control channel (PUCCH) transmitted through the fixed resource region, or through a PUSCH transmitted through the fixed resource region.

The method may further include transmitting a demodulation reference signal (DMRS) or a preamble in a resource region corresponding to a frequency resource region of the grant-free transmission resource, or in a resource region corresponding to a frequency resource region of the selected transmission resource.

The method may further include determining a transport block size (TBS) of the PUSCH, based on the selected transmission resource and a modulation and coding scheme (MCS) of the PUSCH.

According to another embodiment of the disclosure, a grant-free data communication method of a base station in a wireless communication system includes transmitting configuration information of a grant-free transmission resource to a terminal, determining whether a physical uplink shared channel (PUSCH) of the terminal is transmitted in a grant-free transmission resource region determined based on the configuration information, obtaining uplink control information (UCI) from the terminal through a partial region of the grant-free transmission resource region, based on a result of the determining, and obtaining the PUSCH from the terminal, based on the UCI.

The configuration information of the grant-free transmission resource may include information about a resource region in time and frequency resource domain of the grant-free transmission resource, and periodicity information of the grant-free transmission resource, and the resource region in the time and frequency resource domain of the grant-free transmission resource may include a fixed resource region and a flexible resource region.

The obtaining of the UCI may include obtaining the UCI through the fixed resource region, and the obtaining of the PUSCH from the terminal, based on the UCI, may include obtaining the PUSCH through the flexible resource region.

The determining of whether the PUSCH of the terminal is transmitted in the grant-free transmission resource region determined based on the configuration information may include determining whether the PUSCH is transmitted from the terminal, based on whether a demodulation reference signal (DMRS) or a preamble is received in a resource region corresponding to a frequency resource region of the grant-free transmission resource.

According to another embodiment of the disclosure, a terminal using a grant-free data communication method in a wireless communication system includes a transceiver, and at least one controller connected to the transceiver and configured to receive configuration information of a grant-free transmission resource, select a transmission resource for transmitting a physical uplink shared channel (PUSCH), based on the configuration information, transmit uplink control information (UCI) including scheduling information of the selected transmission resource, and transmit the PUSCH through the selected transmission resource.

The configuration information of the grant-free transmission resource may include information about a resource region in time and frequency resource domain of the grant-free transmission resource, and periodicity information of the grant-free transmission resource, the UCI may include time and frequency resource allocation information of the selected transmission resource, and further includes index information of the selected transmission resource when a region of the grant-free transmission resource includes a plurality of partial resources, and the controller may be further configured to transmit the UCI through a partial region of the region of the grant-free transmission resource.

The resource region in the time and frequency resource domain of the grant-free transmission resource may include a fixed resource region and a flexible resource region, the partial region of the region of the grant-free transmission resource may include the fixed resource region, and the selected transmission resource may include the flexible resource region.

The controller may be further configured to transmit the UCI through a physical uplink control channel (PUCCH) transmitted through the fixed resource region, or through a PUSCH transmitted through the fixed resource region.

According to another embodiment of the disclosure, a base station using a grant-free data communication method in a wireless communication system includes a transceiver, and at least one controller connected to the transceiver and configured to transmit configuration information of a grant-free transmission resource to a terminal, determine whether a physical uplink shared channel (PUSCH) of the terminal is transmitted in a grant-free transmission resource region determined based on the configuration information, obtain uplink control information (UCI) from the terminal through a partial region of the grant-free transmission resource region, based on a result of the determining, and obtain the PUSCH from the terminal, based on the UCI.

Hereinafter, the disclosure will be described in detail by explaining embodiments of the disclosure with reference to the attached drawings.

While describing embodiments of the disclosure, technical content that is well-known in the art and not directly related to the disclosure will not be provided. By omitting redundant descriptions, the essence of the disclosure will not be obscured and may be clearly explained.

For the same reasons, some elements are exaggerated, omitted, or schematically illustrated in drawings. Also, the size of each element does not completely reflect a real size thereof. In the drawings, like elements are denoted by like reference numerals.

One or more embodiments of the disclosure and methods of accomplishing the same may be understood more readily by reference to the following detailed description of the embodiments of the disclosure and the accompanying drawings. The disclosure may, however, be embodied in many different forms and should not be construed as being limited to the embodiments of the disclosure set forth herein; rather, these embodiments of the disclosure are provided so that this disclosure will be thorough and complete, and will fully convey the concept of the embodiments of the disclosure to one of ordinary skill in the art, and the disclosure will only be defined by the appended claims. Throughout the disclosure, like reference numerals denote like elements. In the following description of the disclosure, a detailed description of functions and configurations incorporated herein will be omitted when it may make the subject matter of the disclosure unclear. The terms used below are defined considering functions in the disclosure, and may be changed according to the customs or the intents of users or operators. Accordingly, definitions of the terms are understood on the basis of the entire description of this specification.

In the following description, a base station is an entity for allocating a resource to a terminal and may include at least one of a gNode B (gNB), an eNode B (eNB), a Node B (NB), a base station (BS), a radio access unit, a base station controller, or a node on a network. A terminal may include a user equipment (UE), a mobile station (MS), a cellular phone, a smart phone, a computer, or a multimedia system capable of performing communication functions. As used herein, a downlink (DL) refers to a wireless transmission path of signals from a base station to a terminal, and an uplink (UL) refers to a wireless transmission path of signals from the terminal to the base station. Embodiments of the disclosure will be described below on the basis of long term evolution (LTE) or LTE-advanced (LTE-A) systems, but may also be applied to other communication systems having similar technical backgrounds or channel types. For example, such communication systems may include $5^{th}$ generation mobile communication systems (e.g., 5G or new radio (NR) systems) developed after LTE-A, and 5G in the following description may be a concept including existing LTE, LTE-A, and other similar services. Furthermore, the embodiments of the disclosure may also be applied to other communication systems through partial modification without greatly departing from the scope of the disclosure based on the judgment of one of ordinary skill in the art.

It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may produce manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, the "unit" may include at least one processor.

The disclosure proposes a grant-free data channel transmission method and apparatus for supporting non-orthogonal multiple access (NOMA) in a wireless communication system. NOMA refers to a technology for providing communication services to a plurality of terminals in the same time and frequency resource. For example, a plurality of terminals may transmit physical uplink shared channels (PUSCHs) in the same time and frequency resource. A base station may configure a specific time and frequency resource for terminals for the purpose of grant-free transmission, and the terminals may transmit uplink data in the configured resource without uplink grants.

The disclosure also proposes a method of transmitting uplink data by using the entirety or a part of a resource region configured for the purpose of grant-free transmission. The proposed method includes a method of dividing a configured transmission region into a plurality of sub-groups and defining a search space usable to transmit a data channel, a method of transmitting a data channel and uplink control information (UCI) by using a partial region of a configured transmission region, and a method of transmitting UCI by using a partial region of a configured transmission region.

The disclosure also proposes a method of determining a modulation and coding scheme (MCS) and a transport block size (TBS) when grant-free transmission is performed using a partial region of a configured resource. The proposed method includes a method, performed by a base station, of configuring one MCS through higher layer signaling and determining a TBS, based on a transmission region of a terminal, a method, performed by a base station, of configuring a plurality of MCSs and associating the MCSs with transmission regions, and a method, performed by a terminal, of notifying a base station of a MCS and determining a TBS, based on the MCS.

Wireless communication systems providing voice-based services are being developed to broadband wireless communication systems providing high-speed and high-quality packet data services according to communication standards such as high speed packet access (HSPA), long term evolution (LTE) (or evolved universal terrestrial radio access (E-UTRA)), LTE-advanced (LTE-A), and LTE-pro of 3GPP, high rate packet data (HRPD) and ultra mobile broadband (UMB) of 3GPP2, and 802.16e of the Institute of Electrical and Electronics Engineers (IEEE).

As a representative example of the broadband wireless communication systems, LTE systems employ orthogonal frequency division multiplexing (OFDM) for a downlink (DL), and employs single carrier-frequency division multiple access (SC-FDMA) for an uplink (UL). The UL refers to a radio link for transmitting data or a control signal from a terminal (e.g., a UE or a MS) to a base station (e.g., an eNB or a BS), and the DL refers to a radio link for transmitting data or a control signal from the base station to the terminal. Multiple access schemes may distinguish between data or control information of different users by allocating a time-frequency resource for the data or control information of the users not to overlap each other, i.e., to achieve orthogonality therebetween.

As post-LTE systems, 5G systems need to support services capable of simultaneously reflecting and satisfying various requirements of users, service providers, etc. Services considered for the 5G systems include enhanced mobile broadband (eMBB), massive machine-type communication (mMTC), and ultra-reliability low-latency communication (URLLC) services.

The eMBB service is aimed to provide an enhanced data rate compared to a data rate supported by LTE, LTE-A, or LTE-Pro. For example, the eMBB service in the 5G systems need to provide a peak data rate of 20 gigabits per second (Gbps) for a downlink and a peak data rate of 10 Gbps for an uplink in view of a single base station. At the same time, the 5G systems need to provide an increased user-perceived data rate. To satisfy these requirements, the 5G systems require various enhanced transmission/reception technologies including enhanced multiple-input and multiple-output (MIMO). Compared to LTE systems using a transmission bandwidth of up to 20 megahertz (MHz) in a 2 gigahertz (GHz) band, the data rate required for the 5G systems may be satisfied by using a frequency bandwidth wider than 20 MHz in a frequency band of 3 to 6 GHz or over 6 GHz.

At the same time, the mMTC service is considered for the 5G systems to support application services such as the Internet of things (IoT). The mMTC service is required to, for example, support massive user accesses within a cell, enhance terminal coverage, increase battery time, and reduce user charges in order to efficiently provide the IoT service. The IoT service provides a communication function by using a variety of sensors attached to various devices, and thus needs to support a large number of terminals within a cell (e.g., 1,000,000 terminals/km$^2$). In addition, because terminals supporting mMTC are likely to be located in a dead zone not covered by a cell, e.g., a basement of a building, due to service characteristics, the mMTC service may require a wider coverage compared to other services provided by the 5G systems. The terminals supporting mMTC need to be low-priced, and may require a very long battery life time, e.g., 10 to 15 years, because batteries are not frequently replaceable.

Lastly, the URLLC service is a cellular-based wireless communication service used in a mission-critical manner. For example, services used for remote control of robots or machinery, industrial automation, unmanned aerial vehicles, remote healthcare, and emergency alert may be considered. Thus, URLLC communication needs to provide a very low latency and a very high reliability. For example, the URLLC service needs to satisfy an air interface latency less than 0.5 milliseconds and, at the same time, requires a packet error rate equal to or less than $10^{-5}$. Therefore, for the URLLC service, the 5G systems need to provide a smaller transmit time interval (TTI) compared to other services and, at the same time, may be required to allocate a wide resource in a frequency band to ensure reliability of a communication link.

The three services of 5G, i.e., eMBB, URLLC, and mMTC, may be multiplexed and provided by a single system. In this case, the services may use different transmission/reception schemes and different transmission/reception parameters to satisfy different requirements for the services. 5G is not limited to the above-described three services.

A frame structure of a 5G system will now be described in detail with reference to the drawings.

FIG. 1 is a diagram showing a basic structure of a time-frequency domain, which is a radio resource region where a data or control channel is transmitted, in a 5G system, according to an embodiment of the disclosure.

In FIG. 1, the horizontal axis indicates the time domain, and the vertical axis indicates the frequency domain. A basic unit of a resource in the time and frequency domain is a resource element (RE) 101 and may be defined as one orthogonal frequency-division multiplexing (OFDM) symbol 102 on the time axis and one subcarrier 103 on the frequency axis. $N_{sc}^{RB}$ (e.g., 12) consecutive REs in the frequency domain may configure one resource block (RB) 104.

Figure 2:
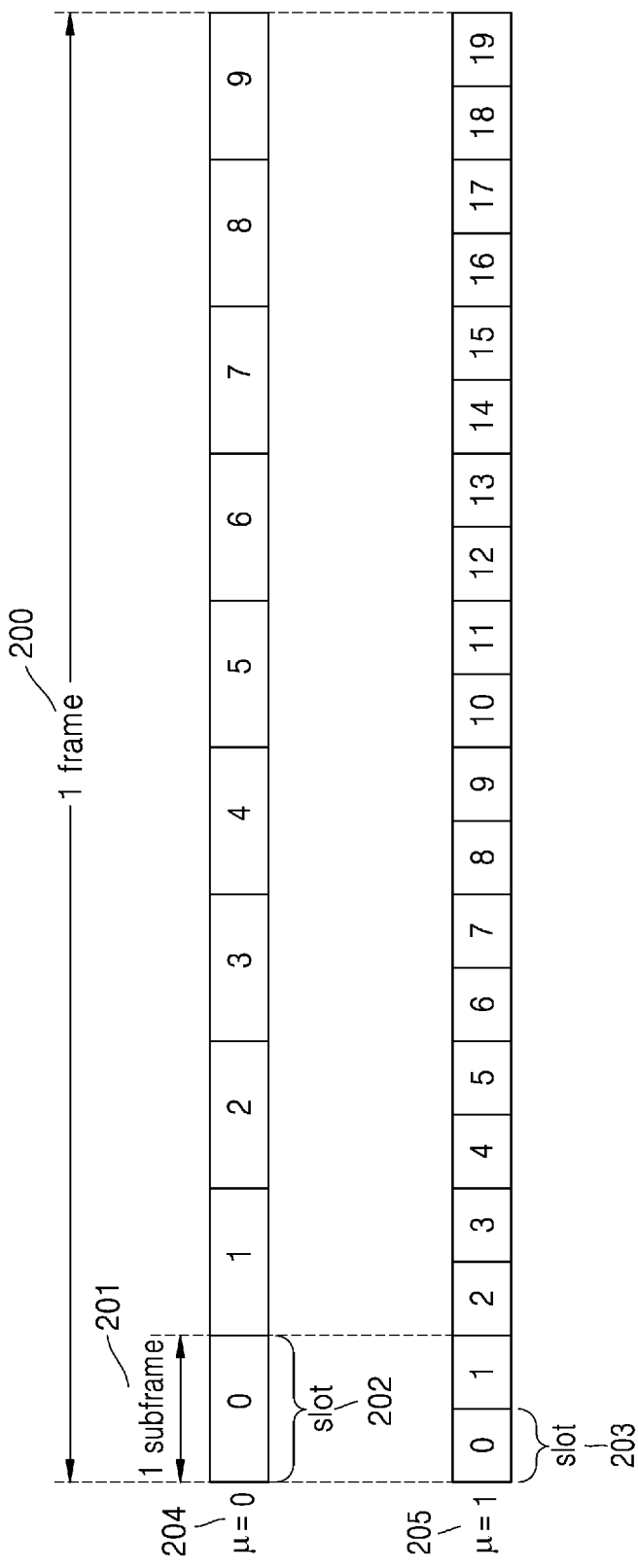
FIG. 2 is a diagram showing a slot structure in 5G, according to an embodiment of the disclosure.

FIG. 2 is a diagram showing a slot structure considered in a 5G system, according to an embodiment of the disclosure.

FIG. 2 shows an example of structures of a frame 200, a subframe 201, and a slot 202. 1 frame 200 may be defined as 10 ms. 1 subframe 201 may be defined as 1 ms, and thus one frame 200 may include a total of 10 subframes 201. 1 slot 202 or 203 may be defined as 14 OFDM symbols (that is, the number of symbols per slot ($N_{symb}^{slot}$)=14). One subframe 201 may include one or more slots 202 or 203, and the number of slots 202 or 203 per subframe 201 may vary depending on a subcarrier spacing value µ 204 or 205. FIG. 2 shows a case in which the subcarrier spacing value is µ=0 (204) or µ=1 (205). One subframe 201 may include one slot 202 when µ=0 (204), or include two slots 203 when µ=1 (205). That is, the number $N_{slot}^{subframe,\mu}$ of slots per subframe may vary depending on the subcarrier spacing value g, and thus the number $N_{slot}^{frame,\mu}$ of slots per frame may vary. $N_{slot}^{subframe,\mu}$ and $N_{slot}^{frame,\mu}$ based on the subcarrier spacing value g may be defined as shown in Table 1.

TABLE 1

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |

TABLE 1-continued

| μ | $N_{symb}^{slot}$ | $N_{slot}^{frame, \mu}$ | $N_{slot}^{subframe, \mu}$ |
|---|---|---|---|
| 2 | 14 | 40 | 4 |
| 3 | 14 | 80 | 8 |
| 4 | 14 | 160 | 16 |
| 5 | 14 | 320 | 32 |

Downlink control information (DCI) in a 5G system will now be described in detail.

In a 5G system, scheduling information of uplink data (or a physical uplink shared channel (PUSCH)) or downlink data (or a physical downlink shared channel (PDSCH)) is transmitted through DCI from a base station to a terminal. The terminal may monitor a fallback DCI format and a non-fallback DCI format for a PUSCH or a PDSCH. The fallback DCI format may include a fixed field predefined between the base station and the terminal, and the non-fallback DCI format may include a configurable field.

The DCI may be channel-coded and modulated and then be transmitted through a physical downlink control channel (PDCCH). A cyclic redundancy check (CRC) is attached to a payload of a DCI message and is scrambled by a radio network temporary identifier (RNTI) corresponding to an identity of the terminal. Different RNTIs may be used depending on the purpose of the DCI message, e.g., UE-specific data transmission, a power control command, or a random access response. That is, the RNTI is not explicitly transmitted but is included and transmitted in a CRC calculation process. When the DCI message transmitted on the PDCCH is received, the terminal may check the CRC by using the allocated RNTI and determine that the DCI message is for the terminal when the result of checking the CRC is correct.

For example, DCI for scheduling a PDSCH for system information (SI) may be scrambled by a system information RNTI (SI-RNTI). DCI for scheduling a PDSCH for a random access response (RAR) message may be scrambled by a random access RNTI (RA-RNTI). DCI for scheduling a PDSCH for a paging message may be scrambled by a paging RNTI (P-RNTI). DCI for notifying a slot format indicator (SFI) may be scrambled by a slot format indicator RNTI (SFI-RNTI). DCI for notifying transmit power control (TPC) may be scrambled by a transmit power control RNTI (TPC-RNTI). DCI for scheduling a UE-specific PDSCH or PUSCH may be scrambled by a cell RNTI (C-RNTI).

A DCI format 0_0 may be used as fallback DCI for scheduling a PUSCH, and a CRC in this case may be scrambled by a C-RNTI. The DCI format 0_0 having the CRC scrambled by the C-RNTI may include, for example, information shown in Table 2.

TABLE 2

Identifier for DCI formats - [1] bit

Frequency domain resource assignment - $\left[\left\lceil \log_2\left(\frac{N_{RB}^{UL,BWP}(N_{RB}^{UL,BWP} + 1)}{2}\right)\right\rceil\right]$ bits Time domain resource assignment - X bits
Frequency hopping flag - 1 bit.
Modulation and coding scheme - 5 bits
New data indicator - 1 bit
Redundancy version - 2 bits
HARQ process number - 4 bits
TPC command for scheduled PUSCH - [2] bits
UL/SUL indicator - 0 or 1 bit A DCI format 0_1 may be used as non-fallback DCI for scheduling a PUSCH, and a CRC in this case may be scrambled by a C-RNTI. The DCI format 0_1 having the CRC scrambled by the C-RNTI may include, for example, information shown in Table 3.

TABLE 3

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment For resource allocation type 0, $\left\lceil \frac{N_{RB}^{UL,BWP}}{P} \right\rceil$ bits For resource allocation type 1, $\left\lceil \log_2\left(\frac{N_{RB}^{UL,BWP}(N_{RB}^{UL,BWP} + 1)}{2}\right)\right\rceil$ ts Time domain resource assignment - 1, 2, 3, or 4 bits
VRB-to-PRB mapping - 0 or 1 bit, only for resource allocation type 1.
   0 bit if only resource allocation type 0 is configured;
   1 bit otherwise.
Frequency hopping flag - 0 or 1 bit, only for resource allocation type 1.
   0 bit if only resource allocation type 0 is configured;
   1 bit otherwise.
Modulation and coding scheme - 5 bits
New data indicator - 1 bit TABLE 3-continued Redundancy version - 2 bits
HARQ process number - 4 bits
1st downlink assignment index - 1 or 2 bits
  1 bit for semi-static HARQ-ACK codebook;
  2 bits for dynamic HARQ-ACK codebook with single HARQ-ACK codebook.
2nd downlink assignment index - 0 or 2 bits
  2 bits for dynamic HARQ-ACK codebook with two HARQ-ACK sub-codebooks;
  0 bit otherwise.
TPC command for scheduled PUSCH - 2 bits SRS resource indicator - $\left\lceil \log_2\left( \sum_{k=1}^{L_{max}} \binom{N_{SRS}}{k} \right) \right\rceil \left\lceil \log_2(N\_"SRS") \right\rceil$ bits $\left\lceil \log_2\left( \sum_{k=1}^{L_{max}} \binom{N_{SRS}}{k} \right) \right\rceil$ for non-codebook based PUSCH transmission;

$\lceil \log_2(N_{SRS}) \rceil$ ts for codebook based PUSCH transmission.
Precoding information and number of layers - up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 0 or 2 bits.
beta_offset indicator - 0 or 2 bits
DMRS sequence initialization - 0 or 1 bit A DCI format 1_0 may be used as fallback DCI for scheduling a PDSCH, and a CRC in this case may be scrambled by a C-RNTI. The DCI format 1_0 having the CRC scrambled by the C-RNTI may include, for example, information shown in Table 4.

TABLE 4

Identifier for DCI formats - [1] bit

Frequency domain resource assignment - $\left\lceil \left\lceil \log_2\left( \frac{N_{RB}^{DL,BWP}(N_{RB}^{DL,BWP} + 1)}{2} \right) \right\rceil \right\rceil$ its Time domain resource assignment - X bits
VRB-to-PRB mapping - 1 bit.
Modulation and coding scheme – 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator - 3 bits
PDSCH-to-HARQ feedback timing indicator - [3] bits A DCI format 1_1 may be used as non-fallback DCI for scheduling a PDSCH, and a CRC in this case may be scrambled by a C-RNTI. The DCI format 1_1 having the CRC scrambled by the C-RNTI may include, for example, information shown in Table 5.

TABLE 5

Carrier indicator - 0 or 3 bits
Identifier for DCI formats - [1] bits
Bandwidth part indicator - 0, 1 or 2 bits
Frequency domain resource assignment For resource allocation type 0, $\left\lceil \frac{N_{RB}^{DL,BWP}}{P} \right\rceil$ bits For resource allocation type 1, $\left\lceil \log_2\left( \frac{N_{RB}^{DL,BWP}(N_{RB}^{DL,BWP} + 1)}{2} \right) \right\rceil$ ts TABLE 5-continued Time domain resource assignment - 1, 2, 3, or 4 bits
VRB-to-PRB mapping - 0 or 1 bit, only for resource allocation type 1.
  0 bit if only resource allocation type 0 is configured;
  1 bit otherwise.
PRB bundling size indicator - 0 or 1 bit
Rate matching indicator - 0, 1, or 2 bits
ZP CSI-RS trigger - 0, 1, or 2 bits
For transport block 1:
  Modulation and coding scheme - 5 bits
  New data indicator - 1 bit
  Redundancy version - 2 bits
For transport block 2:
  Modulation and coding scheme - 5 bits
  New data indicator - 1 bit
  Redundancy version - 2 bits
HARQ process number - 4 bits
Downlink assignment index - 0, 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits TABLE 5-continued Transmission configuration indication - 0 or 3 bits
SRS request - 2 bits
CBG transmission information - 0, 2, 4, 6, or 8 bits
CBG flushing out information - 0 or 1 bit
DMRS sequence initialization - 1 bit A PUSCH transmission method in 5G will now be described in detail.

forward error corrector (FEC) 301, a bit-level scrambler 302, a modulator 303, and a symbol-to-RE mapper 304. The FEC 301 may serve to channel-code an input bit sequence 300. In addition, the FEC 301 may perform input bit sequence repetition. The transmitter structure is not limited to the structure illustrated in FIG. 3, and operations thereof may also be performed by another structure.

The bit-level scrambler 302 may serve to scramble a bit sequence of a total of $M_{bit}$ bits $b^{(q)}(0), \ldots, b^{(q)}(M_{bit}^{(q)}-1)$ output through the FEC 301. For example, a procedure described in Table 6 may be performed.

TABLE 6

The block of bits $b^{(q)}(0),\ldots,b^{(q)}(M_{bit}^{(q)}-1)$, where $M_{bit}^{(q)}$ is the number of bits in codeword q transmitted on the physical channel, shall be scrambled prior to modulation, resulting in a block of scrambled bits $\tilde{b}^{(q)}(0),\ldots,\tilde{b}^{(q)}(M_{bit}^{(q)}-1)$ according to the following pseudo code
Set i = 0
while i < $M_{bit}^{(q)}$
  if $b^{(q)}$ (i) = x // UCI placenolder bits
    $\tilde{b}^{(q)}$ (i) - 1
  else
    if $b^{(q)}$ (i) = y // UCI placenolder bits
      $\tilde{b}^{(q)}$ (i) = $\tilde{b}^{(q)}$ (i-1)
    else
      $\tilde{b}^{(q)}(i)=(b^{(q)}(i)+c^{(q)}(i))mod2$
    end if
  end if
  i = i + 1
end while
where x and y are tags defined in [4, TS 38.212] and where the scrambling sequence $c^{(q)}$ (i) is given by clause 5.2.1. The scrambling sequence generator shall be initialized with
$$c_{init} = n_{RNTI} \cdot 2^{15} + n_{ID}$$
where
- $n_{ID} \in \{0,1,\ldots,1023\}$equals the higher-layer parameter dataScramblingIdentityPUSCHData-scrambling-Identity if configured and the RNTI equals the C-RNTI or CS-RNTI,
- $n_{ID} = N_{ID}^{cell}$ otherwise
and where $n_{RNTI}$ corresponds to the RNTI associated with the PUSCH transmission as described in clause 6.1 of [6, TS 38.214].

A PUSCH transmission method from a terminal to a base station may be roughly divided into a grant-based transmission method and a grant-free (or configured-grant or configured-scheduling) transmission method.

In the grant-based PUSCH transmission method, when traffic to be transmitted to the base station occurs, the terminal may transmit a scheduling request message to the base station through a physical uplink control channel (PUCCH) and the base station having received the scheduling request message may transmit, to the terminal, uplink scheduling DCI corresponding to a scheduling grant. The terminal may receive the uplink scheduling DCI through PDCCH monitoring, and transmit a PUSCH to the base station based on control information notified using the DCI. In the grant-free PUSCH transmission method, initially, the base station may configure a semi-static time/frequency resource for the terminal through higher layer signaling (e.g., radio resource control (RRC) signaling), and the terminal may directly transmit a PUSCH in the configured time/frequency resource without a grant of the base station when traffic to be transmitted to the base station occurs. The grant-free transmission method will be described in detail below.

A PUSCH transmission structure in 5G will now be described.

Figure 3:
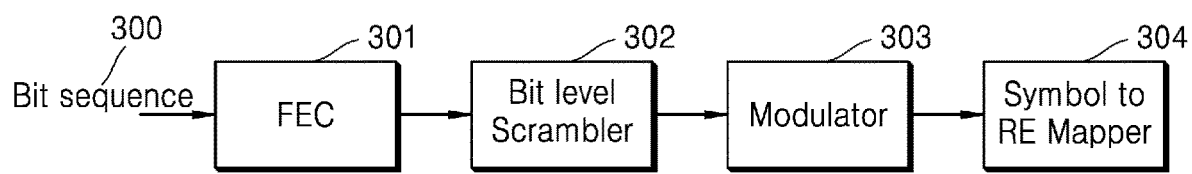
FIG. 3 is a diagram showing a transmitter structure in an orthogonal multiple access (OMA) mode in 5G, according to an embodiment of the disclosure.

FIG. 3 is a diagram showing a transmitter structure for PUSCH transmission in 5G. That is, FIG. 3 shows a functional structure based on a process of a transmitter. According to FIG. 3, a transmitter for a PUSCH may include a A bit sequence $\tilde{b}^{(q)}(0), \ldots, \tilde{b}^{(q)}(M_{bit}^{(q)}-1)$ output through the bit-level scrambler 302 may pass through the modulator 303 to be output as a sequence of $M_{symb}$ modulated symbols $d^{(q)}(0), \ldots, d^{(q)}(M_{bit}^{(q)}-1)$. 5G supports modulation schemes based on modulation orders as shown in Table 7.

TABLE 7

| Transform precoding disabled | | Transform precoding enabled | |
| --- | --- | --- | --- |
| Modulation scheme | Modulation order $Q_m$ | Modulation scheme | Modulation order $Q_m$ |
|  |  | π/2-BPSK | 1 |
| QPSK | 2 | QPSK | 2 |
| 16 QAM | 4 | 160 AM | 4 |
| 640 AM | 6 | 640 AM | 6 |
| 2560 AM | 8 | 2560 AM | 8 |

According to an embodiment, the modulated symbol sequence $d^{(q)}(0), \ldots, d^{(q)}(M_{bit}^{(q)}-1)$ output through the modulator 303 may pass through the symbol-to-RE mapper 304 to be mapped to and transmitted in a time and frequency resource.

TABLE 8

For each of the antenna ports used for transmission of the PUSCH, the block of complex-valued symbols $z^{(p)}(0),...,z^{(p)}(M_{symb}^{ap}-1)$ shall be multiplied with the amplitude scaling $\beta_{PUSCH}$ in order to conform to the tr ansmit power specified in [5, TS 38.213] and mapped in sequence starting with $z^{(p)}(0)$ to resource elements $(k',l)_{p,\mu}$ in the virtual resource blocks assigned for transmission which meet all of the following criteria:
- they are in the virtual resource blocks assigned for transmission, and
- the corresponding resource elements in the corresponding physical resource blocks are not used for transmissio n of the associated DM-RS, PT-RS, or DM-RS intended for other co-scheduled UEs as described in clause 6. 4.1.1.3

The mapping to resource elements $(k',l)_{p,\mu}$ allocated for PUSCH according to [6, TS 38.214] shall be in increasing order of first the index k' over the assigned virtual resource blocks, where k' = 0 is the first subcarrier in the lowest numbered virtual resource block assigned for transtraission, and then the index i, with the starting position given by [6, TS 38.214].

A PUSCH transmission structure based on NOMA in 5G will now be described.

Figure 4:
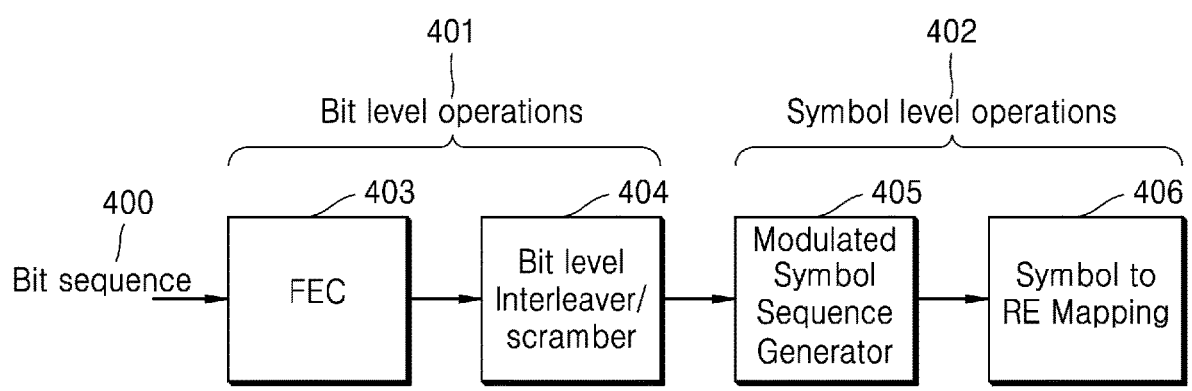
FIG. 4 is a diagram showing a transmitter structure in a non-orthogonal multiple access (NOMA) mode in 5G, according to an embodiment of the disclosure.

According to FIG. 4, operations performed for NOMA by a transmitter may include bit-level operations 401 and symbol-level operations 402. That is, FIG. 4 shows a functional structure based on a process of a transmitter.

Devices for performing the bit-level operations 401 may include a FEC 403 and a bit-level interleaver/scrambler 404. The FEC 403 may serve to channel-code an input bit sequence 400. In addition, the FEC 403 may perform input bit sequence repetition. The bit-level interleaver/scrambler 404 may serve to interleave and scramble bits output through the FEC 403. The bit-level interleaver/scrambler 404 may use a cell-specific or UE-specific interleaver/scrambler which may randomize interference on different terminals for transmitting signals by using the same time and frequency resource.

Devices for performing the symbol-level operations 402 may include a modulated symbol sequence generator 405 and a symbol-to-RE mapper 406. The modulated symbol sequence generator 405 and the symbol-to-RE mapper 406 may include functions such as single or multiple tone modulation, UE-specific symbol spreading (through repetition), cell- or/and UE-specific symbol-level interleaving/scrambling, sparse or non-sparse resource mapping, and transmit power control.

According to an embodiment, the transmitter structure for NOMA is not limited to the structure illustrated in FIG. 4, and operations thereof may also be performed by another structure.

Terminals operating in a NOMA mode may modulate uplink data to be transmitted, and transmit the modulated data through PUSCHs to a base station according to the transmission structure of FIG. 4. In this case, the plurality of terminals operating in the NOMA mode may simultaneously transmit the PUSCHs thereof in the same time and frequency resource. Therefore, the PUSCHs of the plurality of terminals may interfere with each other. The base station having received the PUSCHs of the plurality of terminals operating in the NOMA mode may reconstruct uplink data of each terminal by using a receiver considering the transmission structure.

A receiver structure for uplink NOMA being considered for 5G will now be described in detail.

Figure 5:
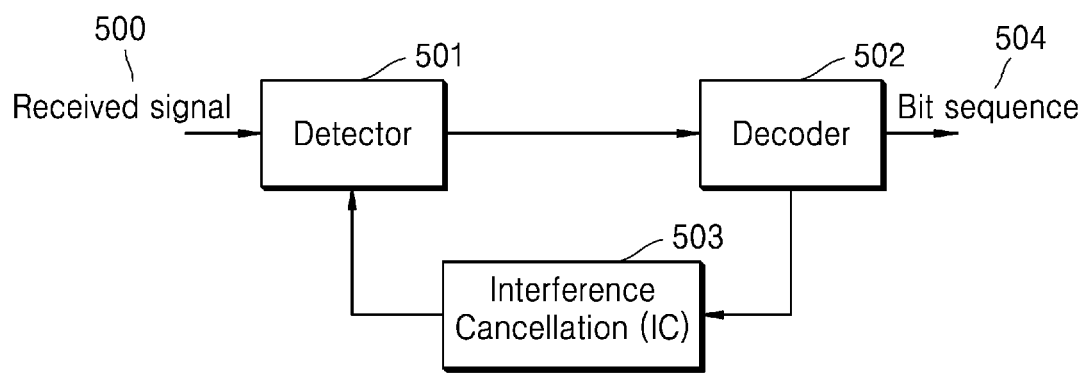
FIG. 5 is a diagram showing a receiver structure in a NOMA mode in 5G, according to an embodiment of the disclosure.

FIG. 5 is a diagram showing a receiver structure for NOMA considered for 5G. That is, FIG. 5 shows a functional structure based on a process of a receiver.

According to FIG. 5, a receiver for NOMA may include a detector 501, a decoder 502, and an interference canceller 503. According to an embodiment, the receiver structure for NOMA is not limited to the structure illustrated in FIG. 5, and operations thereof may also be performed by another structure.

A signal 500 received by the receiver may pass through the detector 501 to be compensated for signal distortion due to a channel. A signal output through the detector 501 may be input to the decoder 502 and be channel-decoded. A signal output through the decoder 502 may pass through the interference canceller 503 to additionally cancel interference. The interference cancellation operation may include, for example, various signal processing schemes for cancelling signal interference between users in NOMA. A value output through the interference canceller 503 may be input back to the detector 501, and the above-described procedure may be repeated. A final output value of the NOMA receiver after repetition may correspond to a bit sequence 504.

A grant-free transmission method of 5G will now be described.

Figure 6:
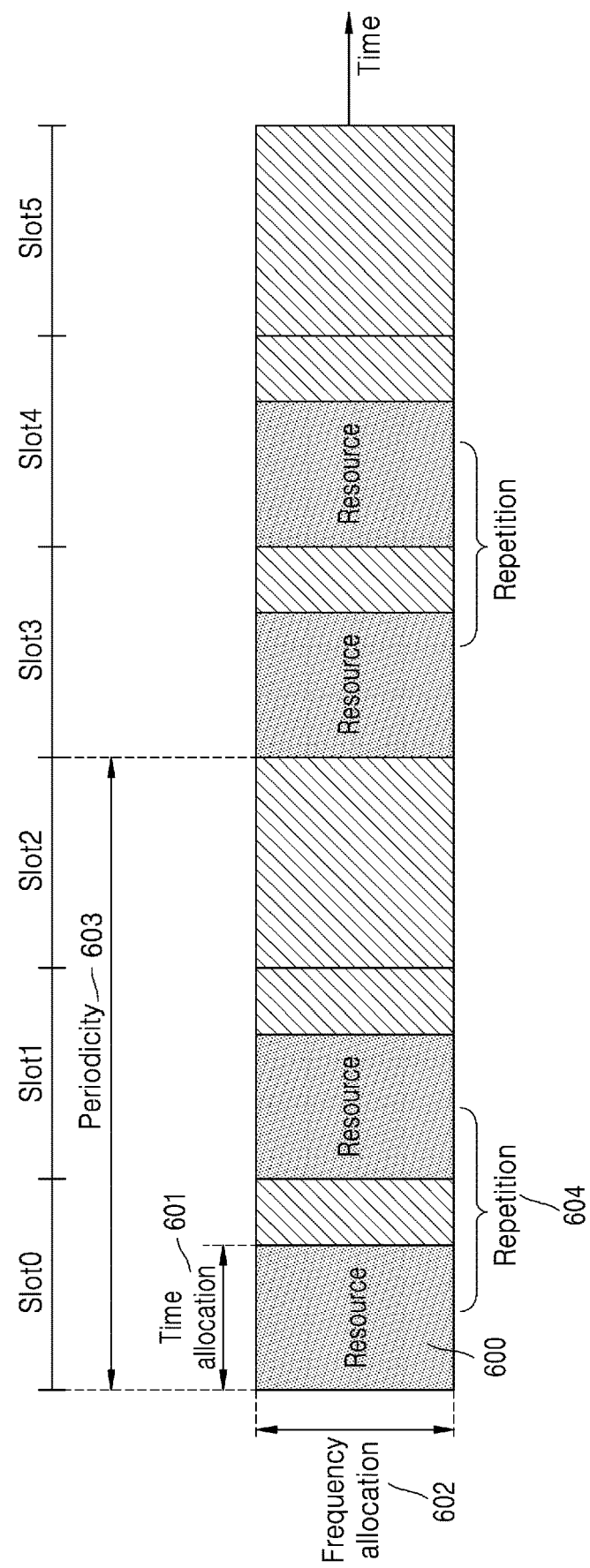
FIG. 6 is a diagram showing an example of a grant-free transmission method in 5G, according to an embodiment of the disclosure.

FIG. 6 is a diagram showing an example of a grant-free transmission method of 5G.

5G may support grant-free (or configured-grant or the like) PUSCH transmission in two types (i.e., Type-1 PUSCH transmission with a configured grant and Type-2 PUSCH transmission with a configured grant).

[Type-1 PUSCH Transmission with a Configured Grant]

In Type-1 PUSCH transmission with a configured grant, a base station may configure a specific time/frequency resource 600 for allowing grant-free PUSCH transmission to a terminal through higher layer signaling, e.g., RRC signaling. For example, as illustrated in FIG. 6, the base station may configure time allocation information 601, frequency allocation information 602, periodicity information 603, etc. of the resource 600. In addition, the base station may configure various parameters for PUSCH transmission (e.g., frequency hopping, demodulation reference signal (DMRS) configuration, modulation and coding scheme (MCS) table, MCS, resource block group (RBG) size, repetition number, and redundancy version (RV)) for the terminal through higher layer signaling. Specifically, configuration information of Table 9 may be included.

TABLE 9

| ConfiguredGrantConfig ::= | SEQUENCE { | |
|---|---|---|
| frequency Hopping | ENUMERATED {model, mode2} | OPTIONAL, -- |
| Need S, | | |
| cg-DMRS-Configuration | DMRS-UplinkConfig, | |
| mcs-Table | ENUMERATED {qam256, spare1} | OPTIONAL, -- |
| Need S | | |

TABLE 9-continued

```
    mcs-TableTransformPrecoder          ENUMERATED {qam256, spare1}       OPTIONAL,
-- Need S
    uci-OnPUSCH                         SetupRelease { CG-UCI-OnPUSCH },
    resourceAllocation                  ENUMERATED { resourceAllocationType0, resourceAllo
cationType1, dynamicSwitch },
    rbg-Size                            ENUMERATED {config2}              OPTIONAL, --
Need S
    powerControlLoopToUse               ENUMERATED {n0, n1},
    p0-PUSCH-Alpha                      P0-PUSCH-AlphaSetId,
    transformPrecoder                   ENUMERATED {enabled}              OPTIONAL, --
Need S
    nrofHARQ-Processes                  INTEGER(1..16),
    repK                                ENUMERATED {n1, n2, n4, n8},
    repK-RV                             ENUMERATED {s1-0231, s2-0303, s3-0000}
            OPTIONAL, -- Cond RepK
    periodicity                         ENUMERATED {
                                        sym2, sym7, sym1x14, sym2x14, sym4x14, sym5x14,
sym8x14, sym10x14, sym16x14, sym20x14,
                                        sym32x14, sym40x14, sym64x14, sym80x14, sym128
x14, sym160x14, sym256x14, sym320x14, sym512x14,
                                        sym640x14, sym1024x14, sym1280x14, sym2560x14,
sym5120x14,
                                        sym6, sym1x12, sym2x12, sym4x12, sym5x12, sym8x
12, sym10x12, sym16x12, sym20x12, sym32x12,
                                        sym40x12, sym64x12, sym80x12, sym128x12, sym16
0x12, sym256x12, sym320x12, sym512x12, sym640x12,
                                        sym1280x12, sym2560x12
                                        },
    configuredGrantTimer                INTEGER (1..64)                   OPTIONAL, -- Nee
d R
    rrc-ConfiguredUplinkGrant           SEQUENCE {
        timeDomainOffset                INTEGER (0..5119),
        timeDomainAllocation            INTEGER (0..15),
        frequencyDomainAllocation       BIT STRING (SIZE(18)),
        antennaPort                     INTEGER (0..31),
        dmrs-SeqInitialization          INTEGER (0..1)                    OPTIONAL, -- Cond NOT
ransformPrecoder
        precoding AndNumberOfLayers     INTEGER (0..63),
        srs-ResourceIndicator           INTEGER (0..15),
        mcsAndTBS                       INTEGER (0..31),
        frequencyHoppingOffset          INTEGER (1..maxNrofPhysicalResourceBlocks-1
) OPTIONAL, -- Need M
        pathlossReferenceIndex          INTEGER (0..maxNrofPUSCH-PathlossReference
RSs-1),
        ...
    }
                                                                                       OP
TIONAL -- Need R
}
```

When the configuration information for Type-1 PUSCH transmission with a configured grant is received from the base station, the terminal may transmit a PUSCH in the periodically configured resource 600 without a grant of the base station. Various parameters for PUSCH transmission (e.g., frequency hopping, DMRS configuration, MCS, RBG size, repetition number, RV, precoding and number of layers, antenna port, and frequency hopping offset) may all follow configuration values notified by the base station.

[Type-2 PUSCH Transmission with a Configured Grant]

In Type-2 PUSCH transmission with a configured grant, the base station may configure some of information about the specific time/frequency resource 600 for allowing grant-free PUSCH transmission (e.g., the periodicity information 603) to the terminal through higher layer signaling (e.g., RRC signaling). In addition, the base station may configure various parameters for PUSCH transmission (e.g., frequency hopping, DMRS configuration, MCS table, RBG size, repetition number, and RV) for the terminal through higher layer signaling. Specifically, the base station may configure configuration information of Table 10 for the terminal through higher layer signaling.

TABLE 10

```
ConfiguredGrantConfig ::=       SEQUENCE {
    frequency Hopping           ENUMERATED {model, mode2}         OPTIONAL,
-- Need S,
    cg-DMRS-Configuration       DMRS-UplinkConfig,
    mcs-Table                   ENUMERATED {qam256, spare1}       OPTIONAL,
-- Need S
    mcs-TableTransformPrecoder  ENUMERATED {qam256, spare1}       OPTIONA
L, -- Need S
    uci-OnPUSCH                 SetupRelease { CG-UCI-OnPUSCH },
    resourceAllocation          ENUMERATED { resourceAllocation Type0, resource
```

TABLE 10-continued

```
AllocationType1, dynamicSwitch },
    rbg-Size              ENUMERATED {config2}           OPTIONAL,
    -- Need S
    powerControlLoopToUse      ENUMERATED {n0, n1},
    p0-PUSCH-Alpha             P0-PUSCH-AlphaSetId,
    transformPrecoder     ENUMERATED {enabled}           OPTIONAL,
    -- Need S
    nrofHARQ-Processes         INTEGER(1..16),
    repK                       ENUMERATED {n1, n2, n4, n8},
    repK-RV                    ENUMERATED {s1-0231, s2-0303, s3-0000}
       OPTIONAL,    -- Cond RepK
    periodicity           ENUMERATED {
                               sym2, sym7, sym1x14, sym2x14, sym4x14, sym5x
14, sym8x14, sym10x14, sym16x14, sym20x14,
                               sym32x14, sym40x14, sym64x14, sym80x14, sym
128x14, sym160x14, sym256x14, sym320x14, sym512x14,
                               sym640x14, sym1024x14, sym1280x14, sym2560x
14, sym5120x14,
                               sym6, sym1x12, sym2x12, sym4x12, sym5x12, sy
m8x12, sym10x12, sym16x12, sym20x12, sym32x12,
                               sym40x12, sym64x12, sym80x12, sym 128x12, sy
m160x12, sym256x12, sym320x12, sym512x12, sym640x12,
                               sym1280x12, sym2560x12
                               },
    configuredGrantTimer       INTEGER (1..64)                OPTIONAL, --
Need R
}
```

The base station may configure a configured scheduling-RNTI (CS-RNTI) for the terminal, and the terminal may monitor a DCI format scrambled by the CS-RNTI. DCI scrambled by a CS-RNTI may be used to activate Type-2 PUSCH transmission with a configured grant (i.e., to allow grant-free PUSCH transmission to the terminal). For example, if DCI fields of the DCI format scrambled by the CS-RNTI and received by the terminal satisfy Table 11, this may be determined as a trigger for grant-free PUSCH transmission.

TABLE 11

|  | DCI format 0_0/0_1 |
| --- | --- |
| HARQ process number | set to all '0's |
| Redundancy version | set to '00' |

The base station may direct the terminal to trigger grant-free PUSCH transmission by using values of specific fields and, at the same time, notify the terminal of the time allocation information 601 and the frequency allocation information 602 of the resource region 600 for grant-free PUSCH transmission in a resource allocation field of the DCI. The terminal may determine the resource region 600 for grant-free PUSCH transmission, based on the periodicity information 603 configured through higher layer signaling and the time allocation information 601 and the frequency allocation information 602 obtained based on the DCI scrambled by the CS-RNTI corresponding to a trigger, and perform grant-free PUSCH transmission in the resource region 600. That is, after the DCI corresponding to a trigger is received, the terminal may transmit a PUSCH in the periodically configured resource 600 without a grant of the base station. The terminal may follow values configured by the base station through higher layer signaling, for some of various parameters for PUSCH transmission (e.g., parameters shown in Table 7, such as, DMRS configuration, MCS table, RBG size, repetition number, RV, and power control), and follow configuration values notified using the received DCI scrambled by the CS-RNTI to indicate a trigger, for the other parameters (e.g., parameters corresponding to fields of DCI format 0_0/0_1, such as, MCS, precoding and number of layers, antenna port, and frequency hopping offset).

The base station may transmit DCI scrambled by a CS-RNTI, to the terminal to release grant-free PUSCH transmission (i.e., to stop (or suspend) allowing grant-free PUSCH transmission to the terminal) and, in this case, if fields of the received DCI format scrambled by the CS-RNTI satisfy Table 12, the terminal may determine this as a release of grant-free PUSCH transmission.

TABLE 12

|  | DCI format 0_0 |
| --- | --- |
| HARQ process number | set to all '0's |
| Redundancy version | set to '00' |
| Modulation and coding scheme | set to all '1's |
| Resource block assignment | set to all '1's |

Embodiments of the disclosure will now be described in detail with reference to the attached drawings. Embodiments of the disclosure will be described below on the basis of 5G systems, but may also be applied to other communication systems having similar technical backgrounds or channel types. The communication systems may include not only 5G systems but also LTE and LTE-A or beyond-5G systems. Therefore, the embodiments of the disclosure may also be applied to other communication systems through partial modification without greatly departing from the scope of the disclosure based on the judgment of one of ordinary skill in the art.

In the following description of the disclosure, a detailed description of functions and configurations incorporated herein will be omitted when it may make the subject matter of the disclosure unclear. The terms used below are defined considering functions in the disclosure, and may be changed according to the customs or the intents of users or operators. Accordingly, definitions of the terms are understood on the basis of the entire description of this specification.

Embodiment 1

A base station may configure a specific time and frequency resource region for a terminal for the purpose of grant-free PUSCH transmission. In this case, when NOMA is allowed in the resource region, the configured resource region may be shared by one or more terminals. In this case, when terminals sharing one resource region for grant-free transmission always transmit grant-free PUSCHs by using the entirety of the configured resource region, interference between the terminals may be greatly increased. Therefore, Embodiment 1 of the disclosure proposes a method, performed by a terminal, of transmitting a grant-free PUSCH by using a part of a configured resource region, and thus PUSCH decoding performance of a base station may be increased by reducing signal interference between a plurality of terminals sharing one resource.

In Embodiment 1 of the disclosure, when the terminal determines that PUSCH transmission is enabled using only a part of the configured resource region without using the entirety thereof (e.g., when the amount of data to be transmitted is sufficiently small, when transmit power of the terminal is not sufficient, or when the base station directs to transmit a PUSCH by using a partial resource), the terminal may transmit a PUSCH in a grant-free manner by using only a partial resource.

Figure 7:
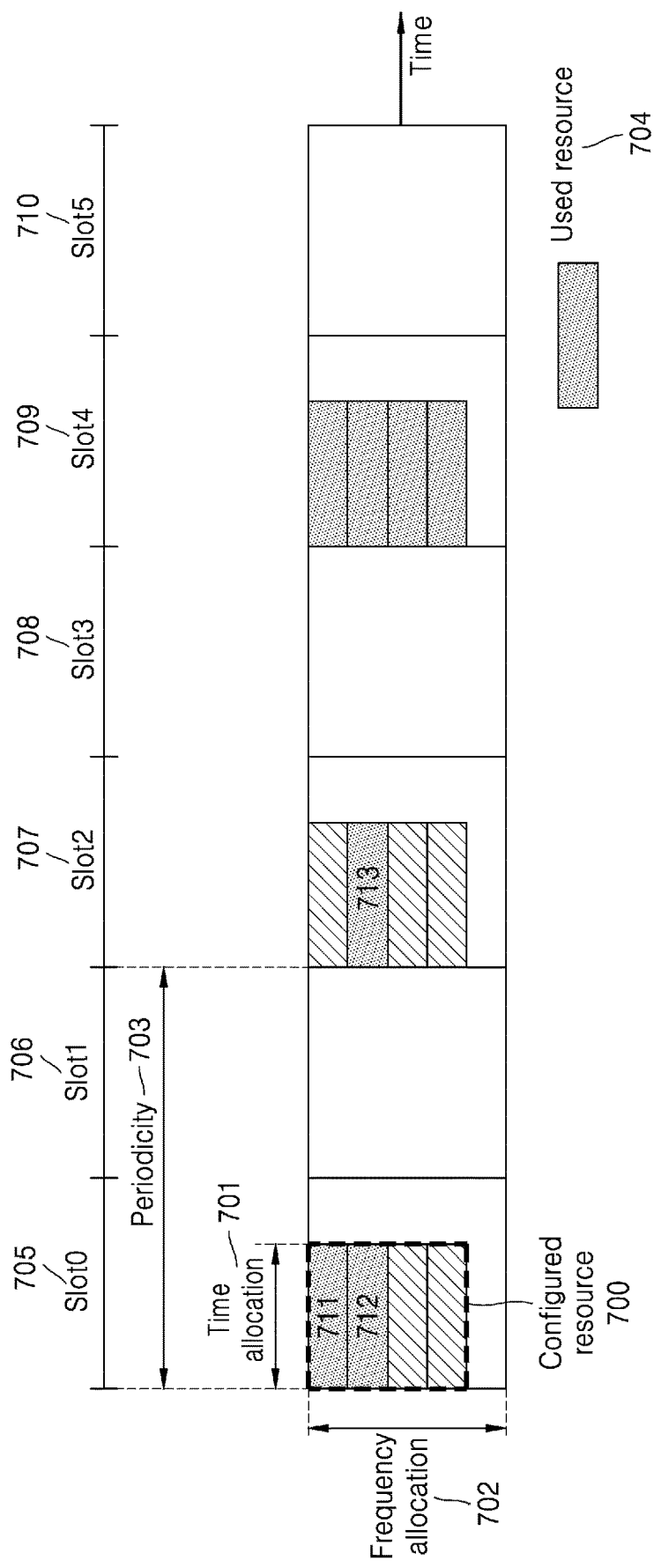
FIG. 7 is a diagram showing an example of a grant-free transmission method according to Embodiment 1 of the disclosure.

A detailed description thereof will now be provided with reference to FIG. 7.

FIG. 7 is a diagram showing Embodiment 1 of the disclosure.

As illustrated in FIG. 7, a base station may configure a specific time and frequency resource 700 and resource periodicity information 703 for a terminal for the purpose of grant-free PUSCH transmission through higher layer signaling, e.g., RRC signaling (for Type-1 PUSCH transmission with a configured grant), or through L1 signaling, e.g., DCI signaling (for Type-2 PUSCH transmission with a configured grant).

In Embodiment 1 of the disclosure, the terminal may transmit a grant-free PUSCH by using the entirety or a part of the resource 700 configured for the purpose of grant-free PUSCH transmission. For example, FIG. 7 shows an example in which the terminal transmits a PUSCH by using resource regions 711 and 712 of the configured resource 700 in a slot0 705, by using a resource region 713 of the configured resource 700 in a slot2 707, and by using the entirety of the configured resource 700 in a slot4 709. That is, a resource 704 used to transmit the PUSCH may include the entirety or a part of the configured resource 700.

Specific embodiments in which the terminal and the base station transmit and receive a grant-free PUSCH by using the entirety or a part of the configured resource 700 will now be described.

In the following description, the resource 700 configured by the base station for the terminal for the purpose of grant-free PUSCH transmission is referred to as a "grant-free transmission resource".

Embodiment 1-1

As a method of transmitting a PUSCH by using a part of a resource region configured for the purpose of grant-free PUSCH transmission, Embodiment 1-1 of the disclosure proposes a method of defining a search space including resource candidate groups usable for PUSCH transmission, and transmitting a PUSCH by selecting one of the PUSCH candidate groups included in the search space.

A base station may configure a grant-free transmission resource and periodicity information of the grant-free transmission resource for a terminal for the purpose of grant-free PUSCH transmission through higher layer signaling, e.g., RRC signaling (for Type-1 PUSCH transmission with a configured grant), or through L1 signaling, e.g., DCI signaling (for Type-2 PUSCH transmission with a configured grant).

In Embodiment 1-1 of the disclosure, the grant-free transmission resource may include one or more partial resources, and these partial resources are referred to as "sub-group resources (SGRs)". A SGR size (i.e., a time and frequency resource size) may be predefined. For example, the SGR size may be equal to the number of symbols configured as the grant-free transmission resource on the time axis, and correspond to one RB or one RBG on the frequency axis.

Alternatively, the SGR size may be configured by the base station for the terminal through higher layer signaling (e.g., RRC signaling). Alternatively, the SGR size may be implicitly determined as a function of the size of the grant-free transmission resource and a total number of SGRs in the grant-free transmission resource. For example, when the number of SGRs of a grant-free transmission resource including a total of X RBs on the frequency axis is Y, one SGR may include ceil(X/Y) (or floor(X/Y)) RBs. In this case, the number Y of SGRs may be predefined or be configured by the base station for the terminal through higher layer signaling (e.g., RRC signaling).

A SGR may be defined as the smallest resource unit usable for grant-free PUSCH transmission. One grant-free transmission resource may include, for example, N (≥1) SGRs, and the terminal may transmit a PUSCH by using specific L (1≤L≤N) SGRs in the grant-free transmission resource. In this case, candidate groups of SGRs usable for PUSCH transmission in the grant-free transmission resource configured for a specific terminal are referred to as "PUSCH candidate groups". A PUSCH candidate group may include L (1≤L≤N) SGRs in the grant-free transmission resource, and one or more PUSCH candidate groups each including specific L SGRs may be present. As a result, a plurality of PUSCH candidate groups may be present in the grant-free transmission resource. A set of available PUSCH candidate groups in the grant-free transmission resource is referred to as a "search space".

The terminal may perform grant-free PUSCH transmission by selecting one of the PUSCH candidate groups in the search space. The base station may monitor the PUSCH candidate groups defined as the search space, to determine whether a PUSCH is transmitted using which PUSCH candidate group (i.e., SGRs), and to receive the PUSCH.

The search space may be UE-specifically (or UE-group-specifically) determined.

Different terminals for which the grant-free transmission resource is configured may have different search spaces including different PUSCH candidate groups. For example, a search space may be defined based on at least one of parameters listed below.

- A total number of SGRs in the grant-free transmission resource
- The number L of SGRs included in one PUSCH candidate group
- The number of PUSCH candidate groups
- A UE-specific identifier
- A time index (e.g., a symbol index or a slot index)

According to an embodiment, the UE-specific identifier may correspond to, for example, at least one of parameters listed below.

A UE identity (ID)
A DMRS scrambling ID
A multiple access (MA) signature ID
An ID additionally configured by the base station According to an embodiment, the parameters related to the search space may be predefined or be configured by the base station for the terminal through higher layer signaling (e.g., RRC signaling) or through L1 signaling (e.g., DCI signaling).

Figure 8:
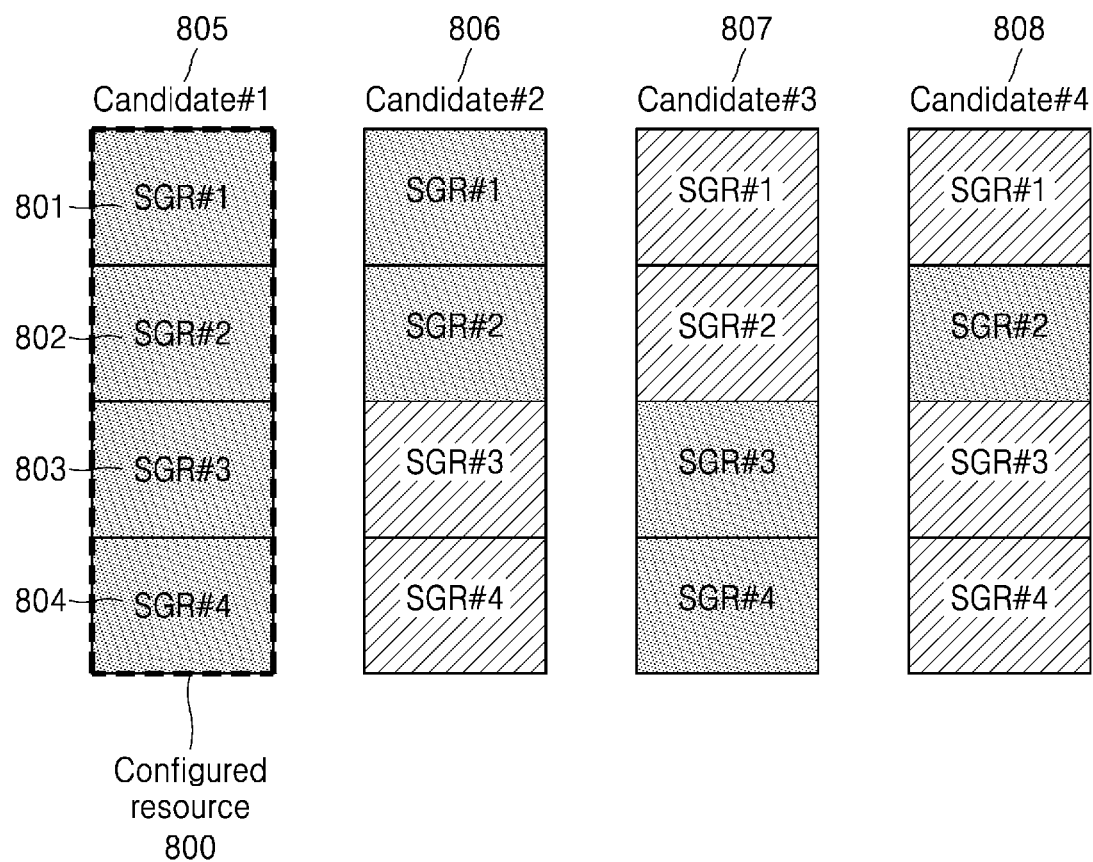
FIG. 8 is a diagram showing a search space according to Embodiment 1-1 of the disclosure.

A detailed description thereof will now be provided with reference to FIG. 8.

FIG. 8 is a diagram showing an example of a search space according to Embodiment 1-1 of the disclosure.

FIG. 8 shows an example in which a grant-free transmission resource 700 includes a total of four SGRs (e.g., SGR #1 801, SGR #2 802, SGR #3 803, and SGR #4 804). FIG. 8 also shows, as an example, a search space including a total of four PUSCH candidate groups (e.g., Candidate group #1 805, Candidate group #2 806, Candidate group #3 807, and Candidate group #4 808). One PUSCH candidate group may include L ($1 \leq L \leq N$) SGRs. In the example of FIG. 8, Candidate group #1 805 includes four SGRs (e.g., SGR #1 801, SGR #2 802, SGR #3 803, and SGR #4 804), Candidate group #2 806 includes two SGRs (e.g., SGR #1 801 and SGR #2 802), Candidate group #3 807 includes two SGRs (e.g., SGR #3 803 and SGR #4 804), and Candidate group #4 808 includes one SGR (e.g., SGR #2 802).

A terminal may perform grant-free PUSCH transmission by selecting one of Candidate group #1 805, Candidate group #2 806, Candidate group #3 807, and Candidate group #4 808 defined as the search space. For example, the terminal may select Candidate group #1 805 to transmit a PUSCH by using SGR #1 801, SGR #2 802, SGR #3 803, and SGR #4 804 (i.e., the entirety of the configured grant-free transmission resource 800), or select Candidate group #2 806 to transmit a PUSCH by using SGR #1 801 and SGR #2 802 (i.e., a part of the configured grant-free transmission resource 800).

A base station may monitor transmission resource regions defined as the search space of the terminal, i.e., Candidate group #1 805, Candidate group #2 806, Candidate group #3 807, and Candidate group #4 808, to determine a candidate group used to transmit the PUSCH. The base station may use various methods to determine whether a PUSCH is transmitted in a specific candidate group. For example, methods described below may be applied.

[Method 1] for Blind Decoding a PUSCH
    According to an embodiment, the base station may blind decode a PUSCH of the terminal on the assumption that the PUSCH is transmitted in each PUSCH candidate group, and determine that the PUSCH is transmitted in the PUSCH candidate group where decoding is succeeded.

[Method 2] for Determining Whether a PUSCH is Transmitted, Based on Whether a DMRS is Transmitted
    According to an embodiment, the base station may determine whether a DMRS of a specific terminal is transmitted in a resource corresponding to each PUSCH candidate group, and determine that a PUSCH is transmitted in the corresponding PUSCH candidate group, and decode the PUSCH, upon determining that the DMRS is transmitted.

[Method 3] for Determining Whether a PUSCH is Transmitted, Based on Whether a Preamble is Transmitted
    According to an embodiment, the terminal may transmit a preamble by using a predefined or preset resource in a resource region corresponding to a specific PUSCH candidate group used to transmit a PUSCH, and the base station may determine whether the PUSCH is transmitted in the resource region used to receive the preamble, and decode the PUSCH, upon determining that the PUSCH is transmitted.

Figure 9:
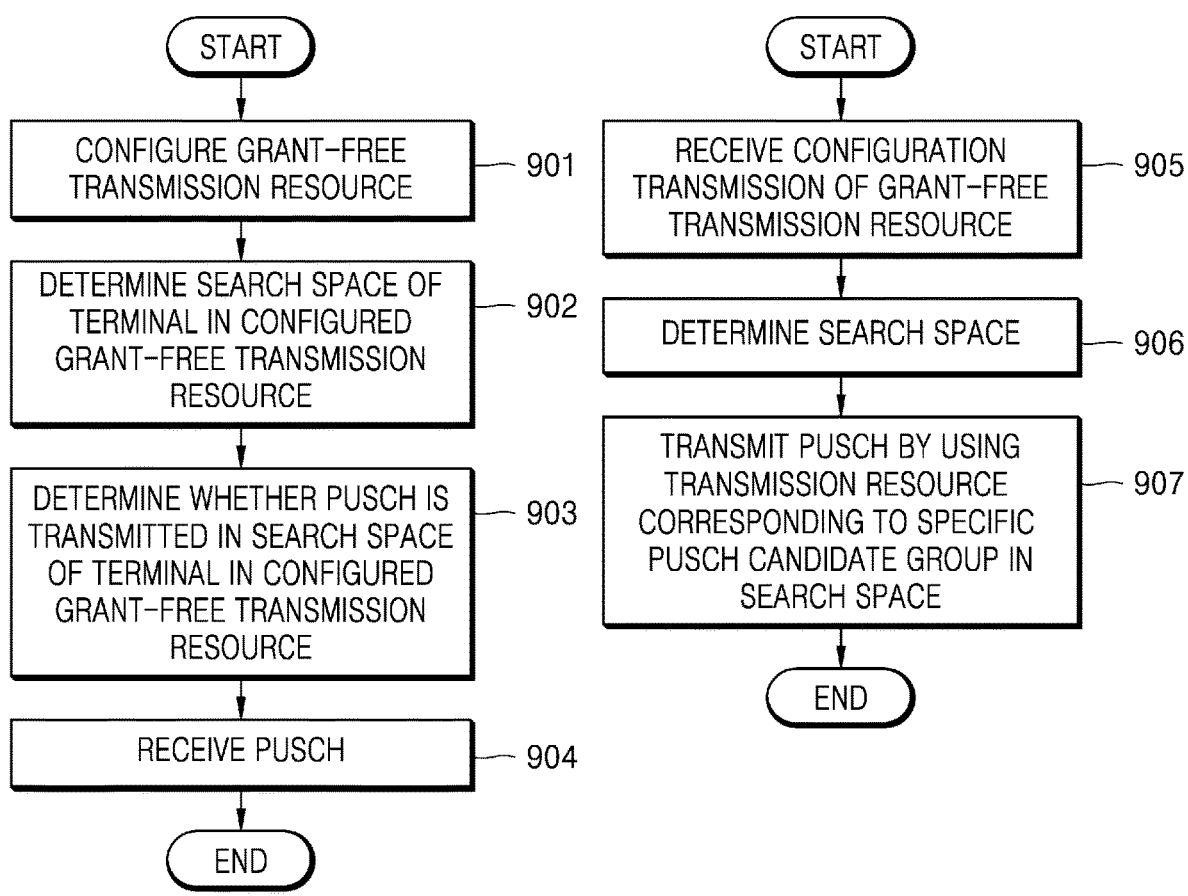
FIG. 9 is a diagram showing base station and terminal operations according to Embodiment 1-1 of the disclosure.

FIG. 9 is a diagram showing base station and terminal procedures according to Embodiment 1-1 of the disclosure.

For the base station procedure, in operation 901, a base station may configure a grant-free transmission resource for a terminal for the purpose of grant-free PUSCH transmission through higher layer signaling or L1 signaling. In operation 902, the base station may determine a search space of the terminal in the configured grant-free transmission resource. In operation 903, the base station may determine whether a PUSCH is transmitted in the search space of the terminal in the configured grant-free transmission resource. In operation 904, the base station may receive and decode the PUSCH.

For the terminal procedure, in operation 905, the terminal may receive configuration information of the grant-free transmission resource. In operation 906, the terminal may determine its UE-specific search space. In operation 907, the terminal may transmit a grant-free PUSCH by using a transmission resource corresponding to a specific PUSCH candidate group in the search space.

According to Embodiment 1-1 of the disclosure, the terminal may transmit a PUSCH by using the entirety or a part of a resource defined as the search space in the whole configured grant-free transmission resource. The base station may blind monitor PUSCH transmission from the terminal only in the predefined search space, and thus minimize complexity required to determine whether the PUSCH is transmitted.

Embodiment 1-2

As a method of transmitting a PUSCH by using a part of a resource region configured for the purpose of grant-free PUSCH transmission, Embodiment 1-2 of the disclosure proposes a method, performed by a terminal, of selecting a resource to be used to transmit a PUSCH, and reporting scheduling information of the selected resource to a base station.

A base station may configure a grant-free transmission resource and periodicity information of the grant-free transmission resource for a terminal for the purpose of grant-free PUSCH transmission through higher layer signaling, e.g., RRC signaling (for Type-1 PUSCH transmission with a configured grant), or through L1 signaling, e.g., DCI signaling (for Type-2 PUSCH transmission with a configured grant).

In Embodiment 1-2 of the disclosure, the grant-free transmission resource may be divided into a "first resource region" and a "second resource region". The "first resource region" may correspond to a resource region required to be used for grant-free PUSCH transmission of the terminal, and the "second resource region" may correspond to a resource region optionally usable for grant-free PUSCH transmission of the terminal. Specifically, for grant-free PUSCH transmission, the terminal may transmit a PUSCH by mapping the PUSCH to the entirety of a resource corresponding to the "first resource region", and to the entirety or a part of a resource corresponding to the "second resource region" in the configured grant-free transmission resource.

Methods described below may be considered as a method of determining the "first resource region" and the "second resource region".

[Method 1]

According to an embodiment, the base station may explicitly configure the "first resource region" and the "second resource region" for the terminal through higher layer signaling (e.g., RRC signaling) or through L1 signaling (e.g., DCI signaling).

[Method 2]

According to an embodiment, the base station may configure the grant-free transmission resource for the terminal and, when the amount X of the whole configured grant-free transmission resource is equal to or greater than a specific threshold Y, a resource region equal to or lower than the threshold (i.e., Y) may be regarded as a "first resource region" and a resource region above the threshold (i.e., X-Y) may be regarded as a "second resource region". The threshold Y may be a predefined fixed value or be configured by the base station for the terminal. For example, when the base station configures a grant-free transmission resource corresponding to a total of X RBs on the frequency axis for the terminal and the threshold corresponds to Y RBs, a resource region from the lowest (or highest) RB index A configured as the grant-free transmission resource to a RB index B corresponding to the Y RBs may be regarded as the "first resource region", and a resource region corresponding to (X-Y) RBs from a (B+1)$^{th}$ RB may be regarded as the "second resource region". Although the frequency-axis resource is described above as an example, the same method may be extended and applied to the time and frequency resource.

The terminal may transmit, in the "first resource region", uplink control information (UCI) including scheduling information (i.e., time and frequency allocation information) of the PUSCH transmitted in the "second resource region". Methods described below may be considered as a method of transmitting the UCI in the "first resource region".

[Method 1]

According to an embodiment, the UCI may be transmitted using a preset PUCCH resource in the first resource region. A MCS of the UCI may be determined based on a configured PUCCH format.

[Method 2]

According to an embodiment, the UCI may be multiplexed and transmitted with the PUSCH transmitted in the first resource region. In this case, a resource location where the UCI is multiplexed in the PUSCH may be predefined. A MCS of the UCI may be determined based on a MCS of the PUSCH.

[Method 3]

According to an embodiment, the UCI may be multiplexed and transmitted with the PUSCH transmitted in the first resource region. In this case, a MCS and a resource location where the UCI is multiplexed in the PUSCH may be predefined or preset.

The UCI transmitted by the terminal in the "second resource region" may include at least one of a plurality of pieces of information listed below. However, the UCI is not limited thereto.

Time-axis resource allocation information of the PUSCH transmitted in the "second resource region"

Frequency-axis resource allocation information of the PUSCH transmitted in the "second resource region"

Index information of a partial resource used to transmit the PUSCH, when the "second resource region" includes N (≥1) partial resources (e.g., SGRs)

The base station may monitor whether a PUSCH of a specific terminal is transmitted in the "first resource region" of the configured grant-free transmission resource. Methods described below may be considered as a method of blind monitoring whether the PUSCH of the terminal is transmitted.

[Method 1] for Blind Decoding a PUSCH and UCI

According to an embodiment, the base station may blind decode a PUSCH on the assumption that the PUSCH and UCI are transmitted in the "first resource region", and determine that the PUSCH is transmitted, when decoding is succeeded.

[Method 2] for Determining Whether a PUSCH and UCI are Transmitted, Based on Whether a DMRS is Transmitted in a "First Resource Region"

According to an embodiment, the base station may determine whether a DMRS of a specific terminal is transmitted in the first resource region, and determine that a PUSCH of the terminal is transmitted, and decode the PUSCH, upon determining that the DMRS is transmitted.

[Method 3] for Determining Whether a PUSCH and UCI are Transmitted, Based on Whether a Preamble is Transmitted in a "First Resource Region"

According to an embodiment, the terminal may transmit a preamble by using a predefined or preset resource in the first resource region to transmit a PUSCH, and the base station may determine that a PUSCH of a specific terminal is transmitted, and then decode the PUSCH, when a preamble of the terminal is received in the first resource region.

In this manner, upon determining that the PUSCH of the specific terminal is transmitted in the "first resource region", the base station may initially decode and obtain the UCI transmitted in the "first resource region". The base station may obtain scheduling information of the PUSCH transmitted in the "second resource region", based on the received UCI. The base station may receive and decode the whole PUSCH, based on information about a resource actually used to transmit the PUSCH in the "first resource region" and the "second resource region".

Figure 10:
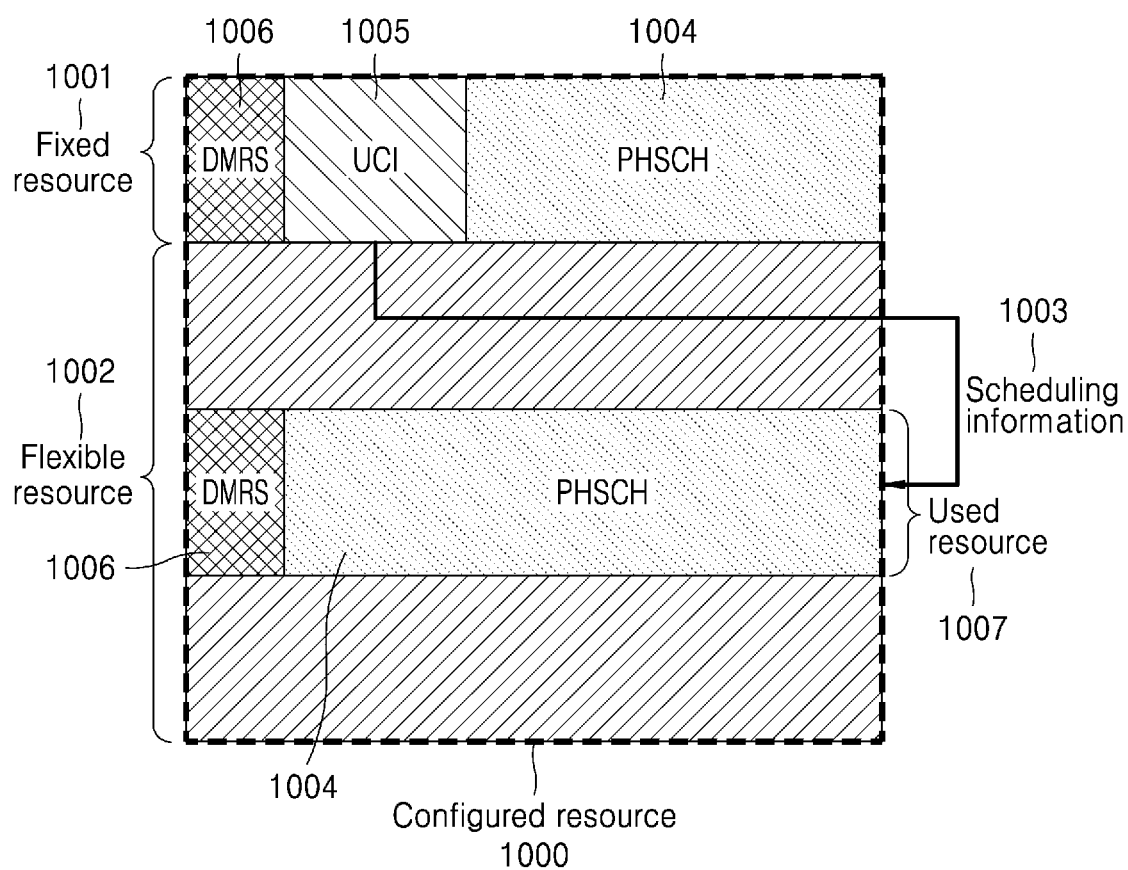
FIG. 10 is a diagram for describing a grant-free physical uplink shared channel (PUSCH) transmission method according to Embodiment 1-2 of the disclosure.

A detailed description thereof will now be provided with reference to FIG. 10.

FIG. 10 is a diagram showing an example of grant-free PUSCH transmission according to Embodiment 1-2 of the disclosure.

FIG. 10 illustrates a grant-free transmission resource 1000, and the whole grant-free transmission resource 1000 is divided into a "first resource region" (or a fixed resource) 1001 and a "second resource region" (or a flexible resource) 1002. As illustrated in FIG. 10, a terminal may transmit a PUSCH 1004 by using the entirety of the "first resource region" 1001 and the entirety or a part of the "second resource region" 1002. That is, a part of the "second resource region" 1002 may be used to transmit the PUSCH 1004 (see reference numeral 1007). The terminal may transmit, to a base station in the "first resource region", UCI 1005 corresponding to scheduling information 1003 (i.e., resource allocation information) of the PUSCH 1004 transmitted in the "second resource region". The base station may obtain the scheduling information 1003 of the PUSCH 1004 transmitted in the "second resource region", based on the UCI 1005 transmitted in the "first resource region". The base station may decode the PUSCH 1004 transmitted in the "first resource region" and the "second resource region", based on the obtained scheduling information 1003.

Figure 11:
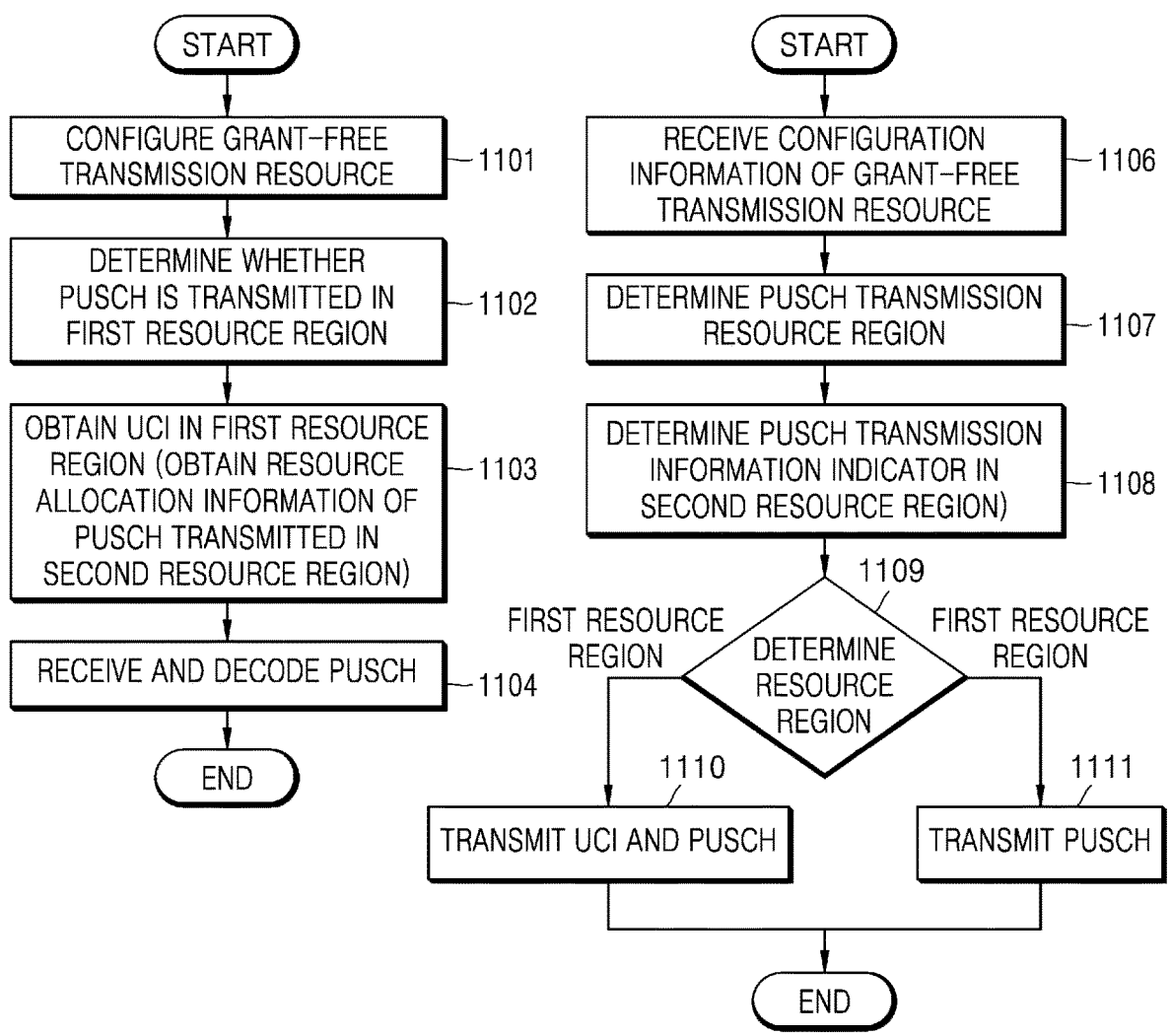
FIG. 11 is a diagram showing base station and terminal operations according to Embodiment 1-2 of the disclosure.

FIG. 11 is a diagram showing base station and terminal procedures according to Embodiment 1-2 of the disclosure.

For the base station procedure, in operation 1101, a base station may configure a grant-free transmission resource for a terminal for the purpose of grant-free PUSCH transmission through higher layer signaling or L1 signaling. In operation 1102, the base station may determine whether a PUSCH of a specific terminal is transmitted in a "first resource region" of the configured grant-free transmission resource. Upon determining in operation 1102 that the PUSCH of the specific terminal is transmitted in the "first resource region", in operation 1103, the base station may obtain UCI transmitted in the "first resource region". The base station may obtain resource allocation information of the PUSCH transmitted in a "second resource region", based on the UCI. In operation 1104, the base station may receive and decode the PUSCH transmitted in the "first resource region" and the entirety or a part of the "second resource region".

For the terminal procedure, in operation 1106, the terminal may receive configuration information of the grant-free transmission resource from the base station. In operation 1107, the terminal may determine a resource region to be used to transmit a PUSCH, in the configured grant-free transmission resource. In operation 1108, the terminal may generate resource allocation information of the PUSCH in the "second resource region". In operation 1109, the terminal may determine whether the resource region mapped to the PUSCH corresponds to the "first resource region" or the "second resource region". The terminal may map and transmit both of the UCI and the PUSCH to and in a resource corresponding to the "first resource region" (operation 1110), and map and transmit the PUSCH to and in a resource corresponding to the "second resource region" (operation 1111).

According to Embodiment 1-2 of the disclosure, the terminal may transmit a PUSCH by using the entirety or a part of a resource region defined as the "second resource region" in the whole configured grant-free transmission resource. The base station may blind monitor PUSCH transmission only in the "first resource region", and thus minimize complexity required to determine whether the PUSCH is transmitted. In addition, the base station may obtain scheduling information of the PUSCH transmitted in the "second resource region", based on UCI transmitted in the "first resource region", and thus decode the PUSCH without additional PUSCH blind monitoring in the "second resource region".

Embodiment 1-2-1

In Embodiment 1-2 of the disclosure, a terminal may transmit UCI in a "first resource region" and transmit a PUSCH in a "second resource region". The terminal may transmit scheduling information (e.g., time and frequency resource allocation information) of the PUSCH transmitted in the "second resource region", as the UCI transmitted in the "first resource region". According to an embodiment, the terminal may transmit the UCI through a preset resource region or a PUCCH in the "first resource region". A base station may determine whether the UCI of the terminal is transmitted in the "first resource region", and obtain scheduling information of the PUSCH transmitted in the "second resource region", based on the UCI of the specific terminal upon determining that the UCI of the specific terminal is transmitted.

Embodiment 1-3

As a method of transmitting a PUSCH by using a part of a resource region configured for the purpose of grant-free PUSCH transmission, Embodiment 1-3 of the disclosure proposes a method, performed by a terminal, of selecting a resource to be used to transmit a PUSCH, and reporting scheduling information of the selected resource to a base station.

A base station may configure a grant-free transmission resource and periodicity information of the grant-free transmission resource for a terminal for the purpose of grant-free PUSCH transmission through higher layer signaling, e.g., RRC signaling (for Type-1 PUSCH transmission with a configured grant), or through L1 signaling, e.g., DCI signaling (for Type-2 PUSCH transmission with a configured grant).

In Embodiment 1-3 of the disclosure, the terminal may transmit a PUSCH to the base station by using the entirety or a part of the configured grant-free transmission resource. The terminal may transmit UCI including scheduling information (i.e., time and frequency allocation information) of the PUSCH, to the base station by using a part of the grant-free transmission resource region. Methods described below may be considered as a method of transmitting the UCI by using a part of the grant-free resource region.

[Method 1]
    According to an embodiment, the UCI may be transmitted using a preset PUCCH resource in the grant-free resource region. A MCS of the UCI may be determined based on a configured PUCCH format.

[Method 2]
    According to an embodiment, the UCI may be multiplexed and transmitted with the PUSCH transmitted in the grant-free resource region. In this case, a resource location where the UCI is multiplexed in the PUSCH may be predefined. A MCS of the UCI may be determined based on a MCS of the PUSCH.

The UCI transmitted by the terminal may include at least one of a plurality of pieces of information listed below. However, the UCI is not limited thereto.

Time-axis resource allocation information of the PUSCH transmitted in the grant-free resource region
    Frequency-axis resource allocation information of the PUSCH transmitted in the grant-free resource region
    Index information of a partial resource used to transmit the PUSCH, when the grant-free resource region includes N (≥1) partial resources (e.g., SGRs)

The base station may monitor whether a PUSCH of a specific terminal is transmitted in the configured grant-free transmission resource. Methods described below may be considered as a method of blind monitoring whether the PUSCH of the terminal is transmitted.

[Method 1] for Blind Decoding a PUSCH and UCI in a Grant-Free Resource Region
    According to an embodiment, the base station may blind decode a PUSCH on the assumption that the PUSCH and UCI are transmitted in the grant-free resource region, and determine that the PUSCH is transmitted, when decoding is succeeded.

[Method 2] for Determining Whether a PUSCH and UCI are Transmitted, Based on Whether a DMRS is Transmitted in a Grant-Free Resource Region According to an embodiment, the base station may determine whether a DMRS of a specific terminal is transmitted in the grant-free resource region, and determine that a PUSCH of the terminal is transmitted, and decode the PUSCH, upon determining that the DMRS is transmitted.

[Method 3] for Determining Whether a PUSCH and UCI are Transmitted, Based on Whether a Preamble is Transmitted in a Grant-Free Resource Region According to an embodiment, the terminal may transmit a preamble by using a predefined or preset resource in the grant-free resource region to transmit a PUSCH, and the base station may determine that a PUSCH of a specific terminal is transmitted, and then decode UCI and the PUSCH, when a preamble of the terminal is received.

In this manner, upon determining that the PUSCH of the specific terminal is transmitted in the grant-free resource region, the base station may initially decode and obtain the UCI transmitted using a previously known resource in the grant-free resource region. The base station may obtain scheduling information of the PUSCH transmitted in the grant-free resource region, based on the received UCI. The base station may receive and decode the whole PUSCH, based on information about a resource actually used to transmit the PUSCH.

According to Embodiment 1-3 of the disclosure, the terminal may transmit a PUSCH by using the entirety or a part of in the whole configured grant-free transmission resource. The base station may blind monitor PUSCH transmission in the grant-free transmission resource in various manners, and obtain scheduling information of a PUSCH by obtaining UCI transmitted in a predetermined resource, upon determining that the PUSCH is transmitted. The base station may decode the PUSCH transmitted in the grant-free transmission resource, based on the obtained scheduling information of the PUSCH.

Embodiment 1-4

Embodiment 1-4 of the disclosure proposes a method, performed by a terminal, of transmitting a DMRS for a PUSCH.

A base station may configure a grant-free transmission resource and periodicity information of the grant-free transmission resource for a terminal for the purpose of grant-free PUSCH transmission through higher layer signaling, e.g., RRC signaling (for Type-1 PUSCH transmission with a configured grant), or through L1 signaling, e.g., DCI signaling (for Type-2 PUSCH transmission with a configured grant).

In Embodiment 1-4 of the disclosure, the terminal may transmit a PUSCH and a DMRS for decoding the PUSCH, by using the entirety or a part of the configured grant-free transmission resource. DMRS transmission methods described below may be considered when the base station determines whether a PUSCH of a specific terminal is transmitted, based on the DMRS is transmitted.

[Method 1]

According to an embodiment, the terminal may transmit a DMRS for decoding a PUSCH, by mapping the DMRS to symbols in a resource actually used to transmit the PUSCH in a whole frequency-axis resource configured as the grant-free transmission resource. The base station may determine whether the PUSCH is transmitted, based on whether the terminal transmits the DMRS. That is, upon determining that a DMRS of a specific terminal is transmitted, the base station may determine that the PUSCH of the terminal is transmitted. According to Method 1, the base station may determine whether the DMRS is transmitted, and thus implicitly obtain scheduling information (e.g., frequency axis allocation information) of the PUSCH. That is, the base station may determine that the PUSCH is transmitted in the frequency resource used to transmit the DMRS.

[Method 2]

According to an embodiment, the terminal may transmit a DMRS for decoding a PUSCH, by mapping the DMRS to symbols in a whole frequency-axis resource configured as the grant-free transmission resource. That is, the terminal may always transmit the DMRS in the whole frequency-axis resource of the grant-free transmission resource regardless of a resource region actually used to map and transmit the PUSCH in the grant-free transmission resource. To determine whether a PUSCH of a specific terminal is transmitted, the base station may always monitor whether a DMRS of the terminal is transmitted in the whole frequency-axis resource of the grant-free transmission resource. According to Method 2, a DMRS blind monitoring procedure of the base station may be simplified. That is, the base station may always monitor a DMRS in the whole frequency-axis resource regardless of a resource actually used to map and transmit a PUSCH in the whole grant-free resource region.

[Method 3]

The terminal may transmit a DMRS for decoding a PUSCH, by mapping the DMRS to symbols in a resource actually used to transmit the PUSCH in a frequency-axis resource configured as the grant-free transmission resource, and another predetermined frequency resource (hereinafter referred to as a "third resource region"). That is, the terminal may always transmit the DMRS in the "third resource region" regardless of a resource region actually used to map and transmit the PUSCH in the grant-free transmission resource. To determine whether a PUSCH of a specific terminal is transmitted, the base station may always monitor whether a DMRS of the terminal is transmitted in the "third resource region" of the grant-free transmission resource. According to Method 3, a DMRS blind monitoring procedure of the base station may be simplified. That is, the base station may always monitor a DMRS in the "third resource region" regardless of a resource actually used to map and transmit a PUSCH in the whole grant-free resource region.

Embodiment 1-4-1

Embodiment 1-4 of the disclosure may be equally applied to a preamble transmission method of a terminal. That is, Embodiment 1-4-1 may correspond to an operation in which a DMRS in Embodiment 1-4 of the disclosure is substituted with a preamble. In addition, various embodiments of the disclosure may be combined.

Embodiment 1-5

A base station may configure a grant-free transmission resource and periodicity information of the grant-free transmission resource for a terminal for the purpose of grant-free PUSCH transmission through higher layer signaling, e.g., RRC signaling (for Type-1 PUSCH transmission with a configured grant), or through L1 signaling, e.g., DCI signaling (for Type-2 PUSCH transmission with a configured grant).

The terminal may transmit UCI including at least one of parameters shown in Table 13, to the base station by using the entirety or a part of the grant-free transmission resource by using a physical layer channel (e.g., a PUSCH or a PUCCH).

For grant-free PUSCH transmission, abase station may configure a grant-free transmission resource for a terminal, and the terminal may transmit a PUSCH to the base station in a grant-free manner by using the entirety or a part of the configured resource region. In this case, a TBS of the

TABLE 13

Bandwidth part indicator - 0, 1 or 2 bits
Frequency domain resource assignment

For resource allocation type 0, $\left\lceil \frac{N_{RB}^{UL,BWP}}{P} \right\rceil$ bits For resource allocation type 1, $\left\lceil \log_2\left(\frac{N_{RB}^{UL,BWP}(N_{RB}^{UL,BWP}+1)}{2}\right)\right\rceil$ ts Time domain resource assignment - 1, 2, 3, or 4 bits
VRB-to-PRB mapping - 0 or 1 bit, only for resource allocation type 1.
  0 bit if only resource allocation type 0 is configured;
  1 bit otherwise.
Frequency hopping flag - 0 or 1 bit, only for resource allocation type 1.
  0 bit if only resource allocation type 0 is configured;
  1 bit otherwise.
Modulation and coding scheme - 5 bits
New data indicator - 1 bit
Redundancy version - 2 bits
HARQ process number - 4 bits
1st downlink assignment index - 1 or 2 bits
  1 bit for semi-static HARQ-ACK codebook;
  2 bits for dynamic HARQ-ACK codebook with single HARQ-ACK codebook.
2nd downlink assignment index - 0 or 2 bits
  2 bits for dynamic HARQ-ACK codebook with two HARQ-ACK sub-codebooks;
  0 bit otherwise.

SRS resource indicator - $\left\lceil \log_2\left(\sum_{k=1}^{L_{max}}\binom{N_{SRS}}{k}\right)\right\rceil \left\lceil \log \right\rceil_2(N\_"SRS")$ bits $\left\lceil \log_2\left(\sum_{k=1}^{L_{max}}\binom{N_{SRS}}{k}\right)\right\rceil$ for non-codebook based PUSCH transmission;

$\lceil \log_2(N_{SRS}) \rceil$ ts for codebook based PUSCH transmission.
Precoding information and number of layers - up to 6 bits
Antenna ports - up to 5 bits
CBG transmission information - 0, 2, 4, 6, or 8 bits
PTRS-DMRS association - 0 or 2 bits.
DMRS sequence initialization - 0 or 1 bit According to Embodiment 1-5 of the disclosure, in grant-free transmission, the terminal may determine a part of scheduling information of a PUSCH and transmit the determined information to the base station. Embodiment 1-5 may be combined with Embodiment 1-2 of the disclosure.

Embodiment 2

In 5G, a transport block size (TBS) of a PUSCH, $N_{info}$ may be determined as shown in Equation 1.

$$N_{info}=N_{RE}\cdot R\cdot Q_m\cdot v \text{ where } N_{RE}=\min(156,N_{RE}')\cdot n,$$
$$N_{RE}'=N_{sc}^{RB}\cdot N_{symb}^{sh}-N_{DMRS}^{PRB}-N_{ah}^{PRB} \quad \text{[Equation 1]}$$

v: Number of layers
$Q_m$: Modulation order
R: Code rate
$n_{PRB}$: Number of RBs allocated for PUSCH
$N_{symb}^{sh}$: Number of symbols allocated for PUSCH
$N_{DMRS}^{PRB}$: Number of REs allocated for DMRS per RB
$N_{ah}^{PRB}$: Overhead, value configured through higher layer signaling as one of {0, 16, 12, 18}

According to Equation 1, the TBS of the PUSCH may be determined based on the amount of a resource to which the PUSCH is allocated, and a MCS (i.e., a modulation order and a code rate).

transmitted PUSCH may vary depending on a MCS and the amount of a resource used by the terminal to transmit the PUSCH. Therefore, a method of determining a MCS and a TBS of a PUSCH, which are agreed between the base station and the terminal, for grant-free PUSCH transmission is required.

Embodiment 2 of the disclosure proposes a method of determining a MCS and a TBS for grant-free PUSCH transmission. For example, methods described below may be applied.

[Method 1]

According to an embodiment, the base station may configure a MCS for the terminal through higher layer signaling, e.g., RRC signaling (for Type-1 PUSCH transmission with a configured grant), or through L1 signaling, e.g., DCI signaling (for Type-2 PUSCH transmission with a configured grant). The terminal may determine a resource used to transmit a PUSCH in the grant-free transmission resource, and the amount of the resource. The terminal may transmit the PUSCH by using the MCS configured by the base station. Therefore, a TBS of the PUSCH transmitted from the terminal may be determined based on the MCS configured by the base station, and the amount of the PUSCH transmission resource determined by the terminal. The base station may determine a resource used to transmit the PUSCH in the grant-free transmission resource (see Embodiment 1). The base station may determine the TBS of the PUSCH in consideration of the MCS configured for the terminal, and the amount of the resource used to transmit the PUSCH of the terminal.

[Method 2]

According to an embodiment, the terminal may determine a resource used to transmit a PUSCH in the grant-free transmission resource, the amount of the resource, and a MCS of the PUSCH. The terminal may determine a TBS of the PUSCH, based on the determined MCS and the determined amount of the resource to which the PUSCH is allocated (see Equation 1). The terminal notifies the base station of the determined MCS of the PUSCH in the form of UCI in the grant-free transmission resource. The base station may determine a resource used to transmit the PUSCH in the grant-free transmission resource (see Embodiment 1 of the disclosure). In addition, the base station may obtain the UCI transmitted from the terminal in the grant-free transmission resource. (See Embodiment 1-2 of the disclosure). The base station may obtain MCS information of the PUSCH transmitted from the terminal, based on the UCI. The base station may determine a TBS of the transmitted PUSCH, based on the PUSCH-scheduled transmission resource and the MCS (see Equation 1).

[Method 3]

According to an embodiment, the base station may configure a MCS per each SGR or per one or more SGRs (e.g., per each PUSCH candidate group according to Embodiment 1 of the disclosure) configured in the grant-free transmission resource. The terminal may determine one or more SGR(s) for transmitting a PUSCH in the grant-free transmission resource, and determine a MCS of the PUSCH, based on a MCS value preset for the SGR(s). The terminal may determine a TBS of the PUSCH, based on the determined MCS and the amount of the determined resource to which the PUSCH is allocated (see Equation 1). The base station may determine a resource used to transmit the PUSCH in the grant-free transmission resource, i.e., SGR(s) used to transmit the PUSCH (see Embodiment 1 of the disclosure). The base station may obtain MCS information, based on the resource used to transmit the PUSCH, and determine a TBS of the transmitted PUSCH, based on the PUSCH-scheduled transmission resource and the MCS (see Equation 1).

Therefore, NOMA may be effectively supported using the above-described data channel transmission method of the disclosure.

Figure 12:
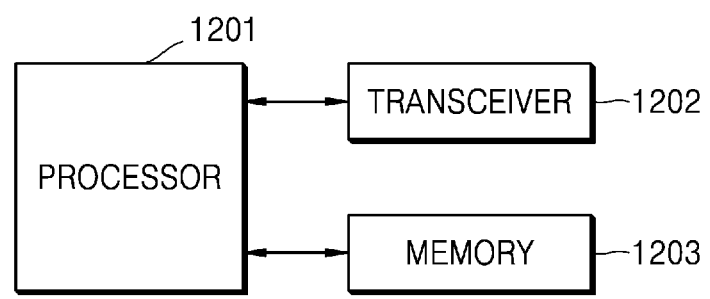
FIG. 12 is a block diagram of a terminal according to an embodiment of the disclosure.
Figure 13:
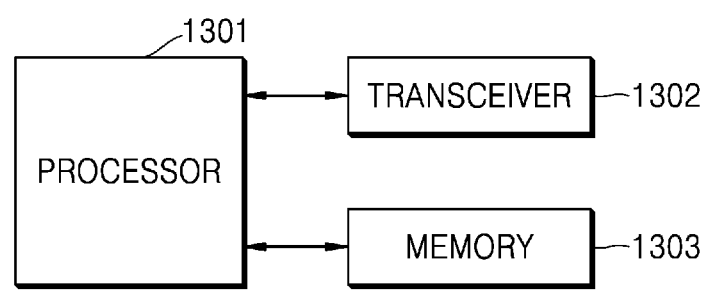
FIG. 13 is a block diagram of a base station according to an embodiment of the disclosure.

To implement the afore-described embodiments of the disclosure, transceivers, processors, and memories of a terminal and a base station are illustrated in FIGS. 12 and 13, respectively. The transceivers, the processors, and the memories of the base station and the terminal may operate according to the afore-described various embodiments to perform a grant-free PUSCH transmission method and a DCI transmission method for supporting NOMA in a 5G system.

Specifically, FIG. 12 is a block diagram of a terminal according to an embodiment of the disclosure. As illustrated in FIG. 12, the terminal of the disclosure may include a processor 1201, a transceiver 1202, and a memory 1203. However, the elements of the terminal are not limited to the above-mentioned examples. For example, the terminal may include a larger or smaller number of elements compared to the above-mentioned elements. The processor 1201, the transceiver 1202, and the memory 1203 may be implemented in the form of a single chip.

According to an embodiment, the processor 1201 may control a series of procedures to operate the terminal according to the afore-described embodiments of the disclosure. For example, the processor 1201 may control the other elements of the terminal to perform a grant-free transmission method for NOMA, i.e., a method of transmitting uplink data in a part of a grant-free transmission resource, a UCI transmission method, or a DMRS transmission method, according to an embodiment of the disclosure. The processor 1201 may include a plurality of processors and execute programs stored in the memory 1203 to perform a grant-free data transmission and reception method of the disclosure.

The transceiver 1202 may transmit and receive signals to and from a base station. The signals transmitted to and received from the base station may include control information and data. To this end, the transceiver 1202 may include a radio-frequency (RF) transmitter for up-converting a frequency of and amplifying a signal to be transmitted, and a RF receiver for low-noise-amplifying and down-converting a frequency of a received signal. However, the RF transmitter and the RF receiver are merely examples, and the elements of the transceiver 1202 are not limited thereto. The transceiver 1202 may receive signals through radio channels and output the signals to the processor 1201, and transmit signals output from the processor 1201, through radio channels.

According to an embodiment, the memory 1203 may store programs and data required to operate the terminal. The memory 1203 may store control information or data included in signals transmitted and received by the terminal. The memory 1203 may include a storage medium such as read-only memory (ROM), random access memory (RAM), a hard disk, a compact disc-ROM (CD-ROM), or a digital versatile disc (DVD), or a combination thereof. The memory 1203 may include a plurality of memories. According to an embodiment, the memory 1203 may store programs for grant-free data transmission and reception.

FIG. 13 is a block diagram of a base station according to an embodiment of the disclosure. As illustrated in FIG. 13, the base station of the disclosure may include a processor 1301, a transceiver 1302, and a memory 1303. However, the elements of the base station are not limited to the above-mentioned examples. For example, the base station may include a larger or smaller number of elements compared to the above-mentioned elements. The processor 1301, the transceiver 1302, and the memory 1303 may be implemented in the form of a single chip.

The processor 1301 may control a series of procedures to operate the base station according to the afore-described embodiments of the disclosure. For example, the processor 1301 may control the other elements of the base station to perform a grant-free transmission method for NOMA, a grant-free transmission resource configuration method, a method of monitoring and receiving uplink data in a part of a grant-free transmission resource, a UCI reception method, or a DMRS reception method, according to an embodiment of the disclosure. The transceiver 1302 may transmit and receive signals to and from a terminal. The signals transmitted to and received from the terminal may include control information and data. To this end, the transceiver 1302 may include a RF transmitter for up-converting a frequency of and amplifying a signal to be transmitted, and a RF receiver for low-noise-amplifying and down-converting a frequency of a received signal. However, the RF transmitter and the RF receiver are merely examples, and the elements of the transceiver 1302 are not limited thereto. The transceiver 1302 may receive signals through radio channels and output the signals to the processor 1301, and transmit signals output from the processor 1301, through radio channels.

According to an embodiment, the memory 1303 may store programs and data required to operate the base station. The memory 1303 may store control information or data included in signals transmitted and received by the base station. The memory 1303 may include a storage medium such as ROM, RAM, a hard disk, a CD-ROM, or a DVD, or a combination thereof. The memory 1303 may include a plurality of memories. According to an embodiment, the memory 1303 may store programs for grant-free data transmission and reception. The methods according to the embodiments of the disclosure as described in the claims and the specification may be implemented in the form of hardware, software, or a combination of both.

When implemented in software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described in the claims and the specification.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as the Internet, an intranet, a local area network (LAN), a wide LAN (WLAN), and a storage area network (SAN). Such a storage device may access, through an external port, a device for implementing the embodiments of the disclosure. An additional storage device on the communication network may also access the device for implementing the embodiments of the disclosure.

In the afore-described embodiments of the disclosure, each element included in the disclosure is expressed in a singular or plural form depending on the described embodiments of the disclosure. However, the singular or plural form is selected properly for a situation assumed for convenience of description and does not limit the disclosure, and elements expressed in a plural form may include a single element and an element expressed in a singular form may include a plurality of elements.

The embodiments of the disclosure described herein are merely to easily describe technical content of the disclosure and to promote understanding of the disclosure, and do not limit the scope of the disclosure. That is, it will be understood by one of ordinary skill in the art that the embodiments of the disclosure may be modified in various ways without departing from the scope of the disclosure. The embodiments of the disclosure may be combined as necessary. For example, a base station and a terminal may operate according to a combination of parts of different embodiments of the disclosure. The embodiments of the disclosure may be applied to other communication systems, and may be modified based on the technical aspects of the embodiments of the disclosure.

The invention claimed is:

1. A grant-free data communication method of a terminal in a wireless communication system, the method comprising:
   receiving, from a base station, configuration information of a grant-free transmission resource, wherein the configuration information of the grant-free transmission resource comprises information about a resource region in time and frequency resource domain of the grant-free transmission resource;
   selecting one of a plurality of partial resources included in the grant-free transmission resource as a transmission resource for transmitting a physical uplink shared channel (PUSCH), based on the configuration information;
   transmitting, to the base station, uplink control information (UCI) comprising scheduling information of the selected partial resource and index information of the selected partial resource; and
   transmitting, to the base station, the PUSCH based on the selected partial resource.

2. The method of claim 1, wherein the configuration information of the grant-free transmission resource further comprises periodicity information of the grant-free transmission resource,
   wherein the UCI comprises time and frequency resource allocation information of the selected partial resource, and
   wherein the transmitting of the UCI comprises transmitting the UCI based on a partial region of the region of the grant-free transmission resource.

3. The method of claim 2, wherein the resource region in the time and frequency resource domain of the grant-free transmission resource comprises a fixed resource region and a flexible resource region,
   wherein the partial region of the region of the grant-free transmission resource comprises the fixed resource region, and
   wherein the selected partial resource comprises at least a part of the flexible resource region.

4. The method of claim 3, wherein the transmitting of the UCI comprises transmitting the UCI through a physical uplink control channel (PUCCH) transmitted through the fixed resource region, or through a PUSCH transmitted through the fixed resource region.

5. The method of claim 2, further comprising transmitting a demodulation reference signal (DMRS) or a preamble in a resource region corresponding to a frequency resource region of the grant-free transmission resource, or in a resource region corresponding to a frequency resource region of the selected partial resource.

6. The method of claim 1, further comprising determining a transport block size (TBS) of the PUSCH, based on the selected partial resource and a modulation and coding scheme (MCS) of the PUSCH.

7. A grant-free data communication method of a base station in a wireless communication system, the method comprising:
   transmitting configuration information of a grant-free transmission resource to a terminal, wherein the configuration information of the grant-free transmission resource comprises information about a resource region in time and frequency resource domain of the grant-free transmission resource;

determining whether a physical uplink shared channel (PUSCH) of the terminal is transmitted in a grant-free transmission resource region determined based on the configuration information;

obtaining uplink control information (UCI) comprising scheduling information and index information of a partial resource in which PUSCH is transmitted, from the terminal through a partial region of the grant-free transmission resource region, based on a result of the determining; and obtaining the PUSCH from the terminal, based on the UCI, via the partial resource among a plurality of partial resources included in the grant-free transmission resource.

8. The method of claim 7, wherein the configuration information of the grant-free transmission resource further comprises periodicity information of the grant-free transmission resource, and wherein the resource region in the time and frequency resource domain of the grant-free transmission resource comprises a fixed resource region and a flexible resource region.

9. The method of claim 8, wherein the obtaining of the UCI comprises obtaining the UCI through the fixed resource region, and wherein the obtaining of the PUSCH from the terminal, based on the UCI, comprises obtaining the PUSCH through the flexible resource region.

10. The method of claim 7, wherein the determining of whether the PUSCH of the terminal is transmitted in the grant-free transmission resource region determined based on the configuration information comprises determining whether the PUSCH is transmitted from the terminal, based on whether a demodulation reference signal (DMRS) or a preamble is received in a resource region corresponding to a frequency resource region of the grant-free transmission resource.

11. A terminal using a grant-free data communication method in a wireless communication system, the terminal comprising:

a transceiver; and at least one controller connected to the transceiver and configured to:

receive, from a base station, configuration information of a grant-free transmission resource, wherein the configuration information of the grant-free transmission resource comprises information about a resource region in time and frequency resource domain of the grant-free transmission resource;

select one of a plurality of partial resources included in the grant-free transmission resources as a transmission resource for transmitting a physical uplink shared channel (PUSCH), based on the configuration information, transmit, to the base station, uplink control information (UCI) comprising scheduling information of the selected partial resource and index information of the selected partial resource; and transmit, to the base station, the PUSCH based on the selected partial resource.

12. The terminal of claim 11, wherein the configuration information of the grant-free transmission resource further comprises periodicity information of the grant-free transmission resource, wherein the UCI comprises time and frequency resource allocation information of the selected partial resource, and wherein the controller is further configured to transmit the UCI based on a partial region of the region of the grant-free transmission resource.

13. The terminal of claim 12, wherein the resource region in the time and frequency resource domain of the grant-free transmission resource comprises a fixed resource region and a flexible resource region, wherein the partial region of the region of the grant-free transmission resource comprises the fixed resource region, and wherein the selected partial resource comprises at least a part of the flexible resource region.

14. The terminal of claim 13, wherein the controller is further configured to transmit the UCI through a physical uplink control channel (PUCCH) transmitted through the fixed resource region, or through a PUSCH transmitted through the fixed resource region.

15. A base station using a grant-free data communication method in a wireless communication system, the base station comprising:

a transceiver; and at least one controller connected to the transceiver and configured to:

transmit configuration information of a grant-free transmission resource to a terminal, wherein the configuration information of the grant-free transmission resource comprises information about a resource region in time and frequency resource domain of the grant-free transmission resource;

determine whether a physical uplink shared channel (PUSCH) of the terminal is transmitted in a grant-free transmission resource region determined based on the configuration information;

obtain uplink control information (UCI) comprising scheduling information and index information of a partial resource in which PUSCH is transmitted, from the terminal through a partial region of the grant-free transmission resource region, based on a result of the determining; and obtain the PUSCH from the terminal, based on the UCI, via the partial resource among a plurality of partial resources included in the grant-free transmission resource.

* * * * *